United States Patent
Adelman et al.

(10) Patent No.: US 12,517,728 B2
(45) Date of Patent: Jan. 6, 2026

(54) INSTRUCTIONS AND SUPPORT FOR CALCULATING PREFIX SUMS

(71) Applicant: Intel Corporation, Santa Clara, CA (US)

(72) Inventors: Menachem Adelman, Modi'in (IL); Amit Gradstein, Binyamina (IL); Regev Shemy, Kiryat Ata (IL); Chitra Natarajan, Queens Village, NY (US); Igor Ermolaev, Nizhny Novgorod (RU)

(73) Assignee: Intel Corporation, Santa Clara, CA (US)

(*) Notice: Subject to any disclaimer, the term of this patent is extended or adjusted under 35 U.S.C. 154(b) by 586 days.

(21) Appl. No.: 17/843,823

(22) Filed: Jun. 17, 2022

(65) Prior Publication Data
US 2023/0409333 A1 Dec. 21, 2023

(51) Int. Cl.
*G06F 9/30* (2018.01)
*G06F 9/38* (2018.01)

(52) U.S. Cl.
CPC ........ *G06F 9/30036* (2013.01); *G06F 9/3001* (2013.01); *G06F 9/30038* (2023.08); *G06F 9/3887* (2013.01)

(58) Field of Classification Search
CPC .............. G06F 9/30036; G06F 9/3001; G06F 9/30038; G06F 9/3887
See application file for complete search history.

(56) References Cited

U.S. PATENT DOCUMENTS

| | | | | |
|---|---|---|---|---|
| 6,542,918 | B1* | 4/2003 | Vishkin | G06F 9/3838 |
| | | | | 712/E9.046 |
| 8,359,460 | B2* | 1/2013 | Gonion | G06F 9/30072 |
| | | | | 712/222 |
| 2009/0132878 | A1* | 5/2009 | Garland | G06F 7/506 |
| | | | | 714/729 |
| 2015/0212972 | A1 | 7/2015 | Boettcher et al. | |
| 2016/0350262 | A1* | 12/2016 | Sarangi | G06F 9/30101 |

OTHER PUBLICATIONS

European Search Report and Search Opinion, EP App. No. 23173881.6, Nov. 17, 2023, 7 pages.
Office Action, EP App. No. 23173881.6, Jul. 12, 2024, 4 pages.
Intention to Grant, EP App. No. 23173881.6, Feb. 18, 2025, 5 pages.

* cited by examiner

*Primary Examiner* — Corey S Faherty
(74) *Attorney, Agent, or Firm* — Nicholson De Vos Webster & Elliott LLP

(57) ABSTRACT

Techniques for performing prefix sums in response to a single instruction are describe are described. In some examples, the single instruction includes fields for an opcode, one or fields to reference a first source operand, one or fields to reference a second source operand, one or fields to reference a destination operand, wherein the opcode is to indicate that execution circuitry is, in response to a decoded instance of the single instruction, to at least: perform a prefix sum by for each non-masked data element position of the second source operand adding a data element of that data element position to each data element of preceding data element positions and adding at least one data element of a defined data element position of the first source operand, and store each prefix sum for each data element position of the second source operand into a corresponding data element position of the destination operand.

25 Claims, 31 Drawing Sheets

FETCH AN INSTANCE OF A SINGLE INSTRUCTION AT LEAST HAVING FIELDS FOR AN OPCODE, ONE OR FIELDS TO REFERENCE A FIRST SOURCE OPERAND, ONE OR FIELDS TO REFERENCE A SECOND SOURCE OPERAND, ONE OR FIELDS TO REFERENCE A DESTINATION OPERAND, WHEREIN THE OPCODE IS TO INDICATE THAT EXECUTION CIRCUITRY IS, IN RESPONSE TO A DECODED INSTANCE OF THE SINGLE INSTRUCTION, TO AT LEAST:

PERFORM A PREFIX SUM BY FOR EACH DATA ELEMENT POSITION OF THE SECOND SOURCE OPERAND ADDING A DATA ELEMENT OF THAT DATA ELEMENT POSITION TO EACH DATA ELEMENT OF PRECEDING DATA ELEMENT POSITIONS AND ADDING AT LEAST ONE DATA ELEMENT OF A DEFINED DATA ELEMENT POSITION OF THE FIRST SOURCE OPERAND, AND

STORE EACH PREFIX SUM FOR EACH DATA ELEMENT POSITION OF THE SECOND SOURCE OPERAND INTO A CORRESPONDING DATA ELEMENT POSITION OF THE DESTINATION OPERAND (IN SOME EXAMPLES SUBJECT TO A WRITEMASK) 1301

DECODE THE INSTRUCTION 1303

RETRIEVE DATA ASSOCIATED WITH THE SOURCE OPERAND(S) AND SCHEDULE 1305

EXECUTE THE DECODED INSTRUCTION ACCORDING TO THE OPCODE 1307

COMMIT A RESULT OF THE EXECUTED INSTRUCTION 1309

FIG. 13

```
┌─────────────────────────────────────────────────────────────────────────┐
│ TRANSLATE A SINGLE INSTRUCTION OF A FIRST INSTRUCTION SET ARCHITECTURE  │
│ INTO ONE OR MORE INSTRUCTIONS OF A SECOND INSTRUCTION SET ARCHITECTURE, │
│ THE SINGLE INSTRUCTION OF THE FIRST INSTRUCTION SET ARCHITECTURE AT LEAST│
│ HAVING FIELDS FOR AN OPCODE, ONE OR FIELDS TO REFERENCE A FIRST SOURCE  │
│ OPERAND, ONE OR FIELDS TO REFERENCE A SECOND SOURCE OPERAND, ONE OR     │
│ FIELDS TO REFERENCE A DESTINATION OPERAND,WHEREIN THE OPCODE IS TO      │
│ INDICATE THAT EXECUTION CIRCUITRY IS, IN RESPONSE TO A DECODED INSTANCE OF│
│ THE SINGLE INSTRUCTION, TO AT LEAST:                                    │
│      PERFORM A PREFIX SUM BY FOR EACH DATA ELEMENT POSITION OF THE      │
│ SECOND SOURCE OPERAND ADDING A DATA ELEMENT OF THAT DATA ELEMENT        │
│ POSITION TO EACH DATA ELEMENT OF PRECEDING DATA ELEMENT POSITIONS AND   │
│ ADDING AT LEAST ONE DATA ELEMENT OF A DEFINED DATA ELEMENT POSITION OF  │
│ THE FIRST SOURCE OPERAND, AND                                           │
│      STORE EACH PREFIX SUM FOR EACH DATA ELEMENT POSITION OF THE        │
│ SECOND SOURCE OPERAND INTO A CORRESPONDING DATA ELEMENT POSITION OF     │
│ THE DESTINATION OPERAND  (IN SOME EXAMPLES SUBJECT TO A WRITEMASK)      │
│                                 1401                                    │
└─────────────────────────────────────────────────────────────────────────┘
                                    │
                                    ▼
┌─────────────────────────────────────────────────────────────────────────┐
│       DECODE THE ONE OR MORE INSTRUCTIONS SECOND INSTRUCTION SET        │
│                         ARCHITECTURE 1403                               │
└─────────────────────────────────────────────────────────────────────────┘
                                    │
                                    ▼
┌─────────────────────────────────────────────────────────────────────────┐
│     RETRIEVE DATA ASSOCIATED WITH THE SOURCE OPERAND(S) AND SCHEDULE 1405│
└─────────────────────────────────────────────────────────────────────────┘
                                    │
                                    ▼
┌─────────────────────────────────────────────────────────────────────────┐
│ EXECUTE THE DECODED ONE OR MORE INSTRUCTIONS OF THE SECOND              │
│ INSTRUCTION SET ARCHITECTURE TO:                                        │
│ [                                                                       │
│ PERFORM MOST GENERIC EXECUTION/OPERATION OF THE INSTRUCTION             │
│ FOLLOW UP FIGURE FOR DETAILED VERSION OF THE GENERIC EXECUTION          │
│ ]                                                                       │
│ 1407                                                                    │
└─────────────────────────────────────────────────────────────────────────┘
                                    │
                                    ▼
┌─────────────────────────────────────────────────────────────────────────┐
│            COMMIT A RESULT OF THE EXECUTED INSTRUCTION(S)               │
│                              1409                                       │
└─────────────────────────────────────────────────────────────────────────┘
```

FIG. 14

FETCH AN INSTANCE OF A SINGLE INSTRUCTION AT LEAST HAVING FIELDS FOR AN OPCODE, ONE OR FIELDS TO REFERENCE A FIRST SOURCE OPERAND, ONE OR FIELDS TO REFERENCE A SECOND SOURCE OPERAND, ONE OR FIELDS TO REFERENCE A DESTINATION OPERAND, WHEREIN THE OPCODE IS TO INDICATE THAT EXECUTION CIRCUITRY IS, IN RESPONSE TO A DECODED INSTANCE OF THE SINGLE INSTRUCTION, TO AT LEAST:

PERFORM A PREFIX SUM BY FOR EACH DATA ELEMENT POSITION OF THE SECOND SOURCE OPERAND ADDING A DATA ELEMENT OF THAT DATA ELEMENT POSITION TO EACH DATA ELEMENT OF PRECEDING DATA ELEMENT POSITIONS AND ADDING AT LEAST ONE DATA ELEMENT OF A DEFINED DATA ELEMENT POSITION OF THE FIRST SOURCE OPERAND, AND

STORE EACH PREFIX SUM FOR EACH DATA ELEMENT POSITION OF THE SECOND SOURCE OPERAND INTO A CORRESPONDING DATA ELEMENT POSITION OF THE DESTINATION OPERAND
1501

DECODE THE INSTRUCTION 1503

RETRIEVE DATA ASSOCIATED WITH THE SOURCE OPERAND(S) AND SCHEDULE 1505

EXECUTE THE DECODED INSTRUCTION ACCORDING TO THE OPCODE
1507

COMMIT A RESULT OF THE EXECUTED INSTRUCTION
1509

FIG. 15

FETCH AN INSTANCE OF A SINGLE INSTRUCTION AT LEAST HAVING FIELDS FOR AN OPCODE, ONE OR FIELDS TO REFERENCE A FIRST SOURCE OPERAND, ONE OR FIELDS TO REFERENCE A SECOND SOURCE OPERAND, ONE OR FIELDS TO REFERENCE A DESTINATION OPERAND, ONE OR MORE FIELDS TO REFERENCE A MASK OPERAND, WHEREIN THE OPCODE IS TO INDICATE THAT EXECUTION CIRCUITRY IS, IN RESPONSE TO A DECODED INSTANCE OF THE SINGLE INSTRUCTION, TO AT LEAST:

PERFORM A PREFIX SUM BY FOR EACH NON-MASKED DATA ELEMENT POSITION OF THE SECOND SOURCE OPERAND (AS INDICATED BY THE MASK OPERAND) ADDING A DATA ELEMENT OF THAT DATA ELEMENT POSITION TO EACH DATA ELEMENT OF PRECEDING DATA ELEMENT POSITIONS AND ADDING AT LEAST ONE DATA ELEMENT OF A DEFINED DATA ELEMENT POSITION OF THE FIRST SOURCE OPERAND, AND

STORE EACH PREFIX SUM FOR EACH DATA ELEMENT POSITION OF THE SECOND SOURCE OPERAND INTO A CORRESPONDING DATA ELEMENT POSITION OF THE DESTINATION OPERAND (IN SOME EXAMPLES SUBJECT TO A WRITEMASK)
1601

DECODE THE INSTRUCTION 1603

RETRIEVE DATA ASSOCIATED WITH THE SOURCE OPERAND(S) AND SCHEDULE 1605

EXECUTE THE DECODED INSTRUCTION ACCORDING TO THE OPCODE
1607

COMMIT A RESULT OF THE EXECUTED INSTRUCTION
1609

FIG. 16

FETCH AN INSTANCE OF A SINGLE INSTRUCTION AT LEAST HAVING FIELDS FOR AN OPCODE, ONE OR FIELDS TO REFERENCE A FIRST SOURCE OPERAND, ONE OR FIELDS TO REFERENCE A SECOND SOURCE OPERAND, ONE OR FIELDS TO REFERENCE A DESTINATION OPERAND, ONE OR MORE FIELDS TO REFERENCE A MASK OPERAND, WHEREIN THE OPCODE IS TO INDICATE THAT EXECUTION CIRCUITRY IS, IN RESPONSE TO A DECODED INSTANCE OF THE SINGLE INSTRUCTION, TO AT LEAST:

PERFORM A PREFIX SUM BY FOR EACH NON-MASKED DATA ELEMENT POSITION OF THE DESTINATION OPERAND AS INDICATED BY THE MASK OPERAND ADDING A BROADCASTED DATA ELEMENT OF SECOND SOURCE OPERAND TO AT LEAST ONE DATA ELEMENT OF A DEFINED DATA ELEMENT POSITION OF THE FIRST SOURCE OPERAND AND TO EACH PRECEDING BROADCASTED DATA ELEMENT AS INDICATED BY THE MASK OPERAND, AND

STORE EACH PREFIX SUM INTO THE DESTINATION OPERAND (IN SOME EXAMPLES SUBJECT TO THE MASK OPERAND)
1801

DECODE THE INSTRUCTION 1803

RETRIEVE DATA ASSOCIATED WITH THE SOURCE OPERAND(S) AND SCHEDULE 1805

EXECUTE THE DECODED INSTRUCTION ACCORDING TO THE OPCODE
1807

COMMIT A RESULT OF THE EXECUTED INSTRUCTION
1809

FIG. 18

| PREFIX(ES) 2501 | OPCODE 2503 | ADDRESSING 2505 | DISPLACEMENT 2507 | IMMEDIATE 2509 |

FIG. 25

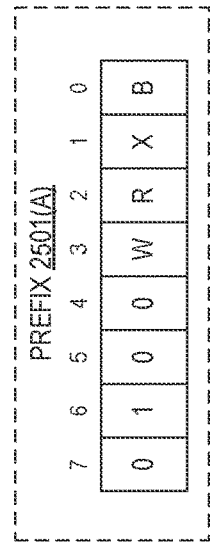
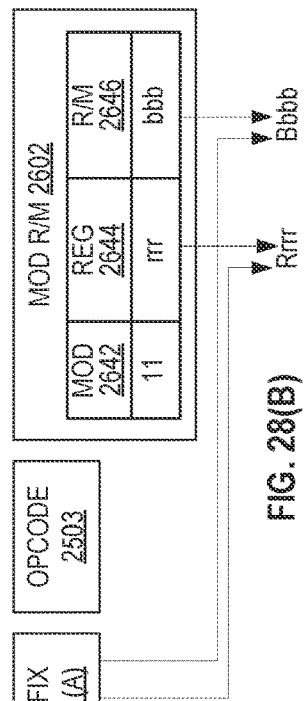
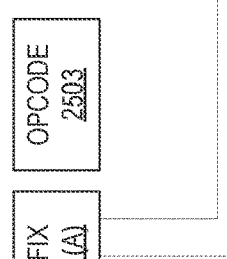
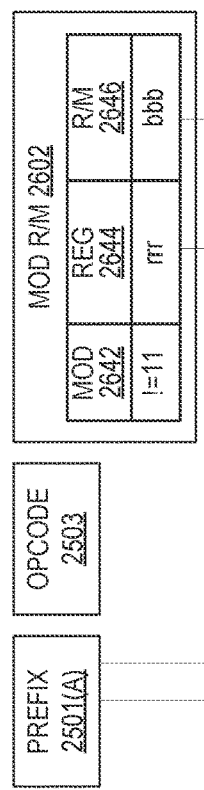
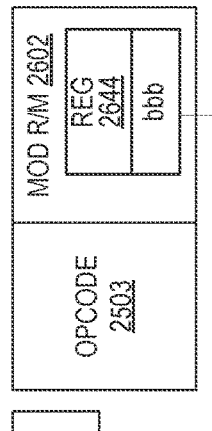
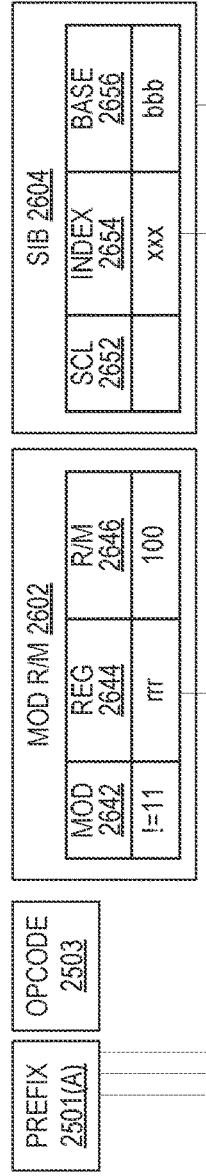

INSTRUCTIONS AND SUPPORT FOR CALCULATING PREFIX SUMS

BACKGROUND

Prefix-sum is a common high-performance computing primitive. Given a vector of elements e0, e1, e2, e3, etc., the prefix sum is a vector of partial sums: e0, e0+e1, e0+e1+e2, etc. A prefix sum can also be non-inclusive and in that case will be 0, e0, e0+e1, etc.

BRIEF DESCRIPTION OF DRAWINGS

Various examples in accordance with the present disclosure will be described with reference to the drawings, in which:

FIG. 13 illustrates an example of method performed by a processor to process a prefix sum instruction.

FIG. 14 illustrates an example of method to process a prefix sum instruction using emulation or binary translation.

FIG. 15 illustrates an example of method performed by a processor to process a prefix sum instruction.

FIG. 16 illustrates an example of method performed by a processor to process a prefix sum instruction.

FIG. 18 illustrates an example of method performed by a processor to process a prefix sum instruction.

FIG. 25 illustrates examples of an instruction format.

FIG. 27 illustrates examples of a first prefix.

FIGS. 28(A)-(D) illustrate examples of how the R, X, and B fields of the first prefix in FIG. 27 are used.

DETAILED DESCRIPTION

The present disclosure relates to methods, apparatus, systems, and non-transitory computer-readable storage media for performing one or more prefix sums in response to an instance of a single instruction.

Prefix sums are used in various parallel algorithms and workloads such as radix sort, weather prediction, and others. Detailed herein are instructions, and their support, to extend horizontal single instruction, multiple data (SIMD) or vector capabilities beyond reduction and support the calculation of prefix sums using a single instruction. The use of a single instruction reduces an amount of code to perform prefix sums and should save both energy (for storing code and executing code) and time.

When executed the instructions detailed herein cause a calculation of a vector of prefix sums from a given source vector register. Additionally, in some examples an additional source (e.g., vector or scalar) provides an initial value which allows for a carry of previous cumulative prefix sum. The allows for the calculation of prefix sums of a vector which is larger than a single register. In some examples, the one or more of the instructions support writemasking or predication where masked elements are ignored when calculating the prefix sum.

In some examples, different datatypes and sizes are supported. For example, integer sizes of nibble (N), byte (B), word (16-bit), double-word (32-bit), and/or quad-word (64-bit) may be supported. Additionally, the addition may be signed and/or unsigned depending on the instruction. Other datatypes that may be supported include, but are not limited to: half-precision floating point (FP16), single precision floating point (FP32), double precision floating point (FP64), FP19, and bfloat16 (BF16). In some examples, for floating point prefix sums, the summation can be done in different orders such as sequentially or in parallel.

Figure 1:
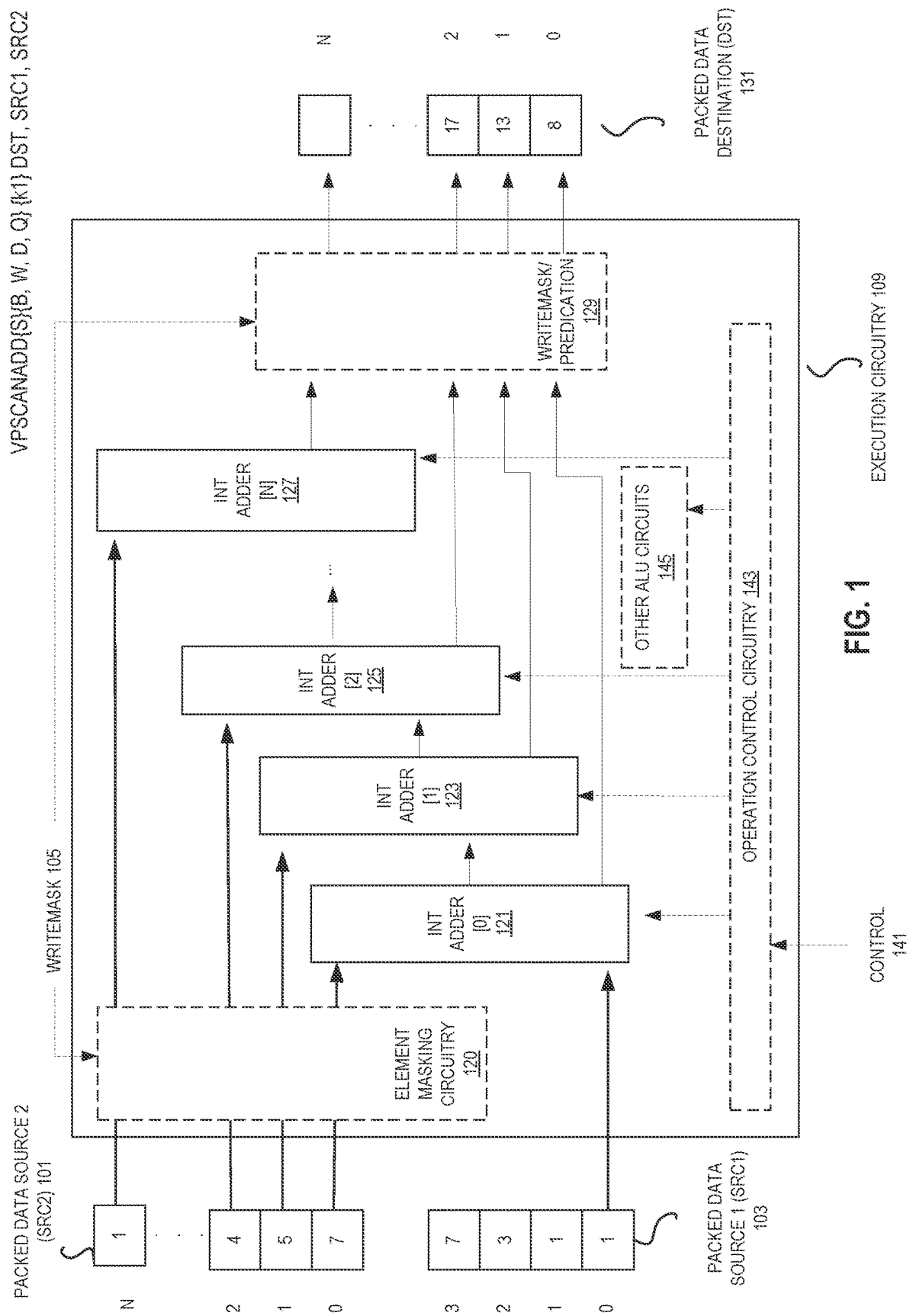
FIG. 1 illustrates exemplary executions of an integer prefix sum instruction.

FIG. 1 illustrates exemplary executions of an integer prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on. In this example, the opcode mnemonic may include such an identification with B, W, D, or Q. In some examples, the opcode indicates if the addition is to be signed or not. In this example, the opcode mnemonic may include an "S" for signed (and in some examples a "U" for unsigned).

Figure 29A:
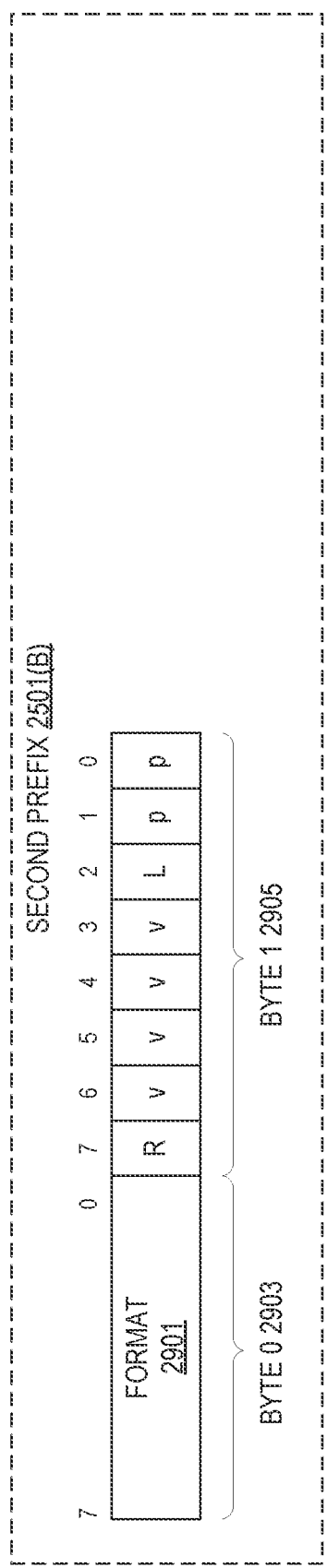
FIGS. 29(A)-(B) illustrate examples of a second prefix.
Figure 29B:
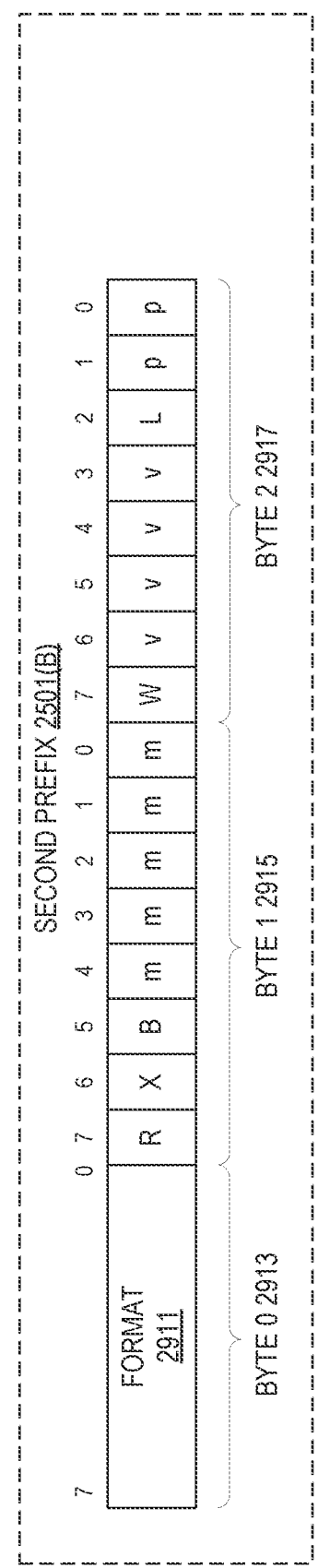
Figure 30:
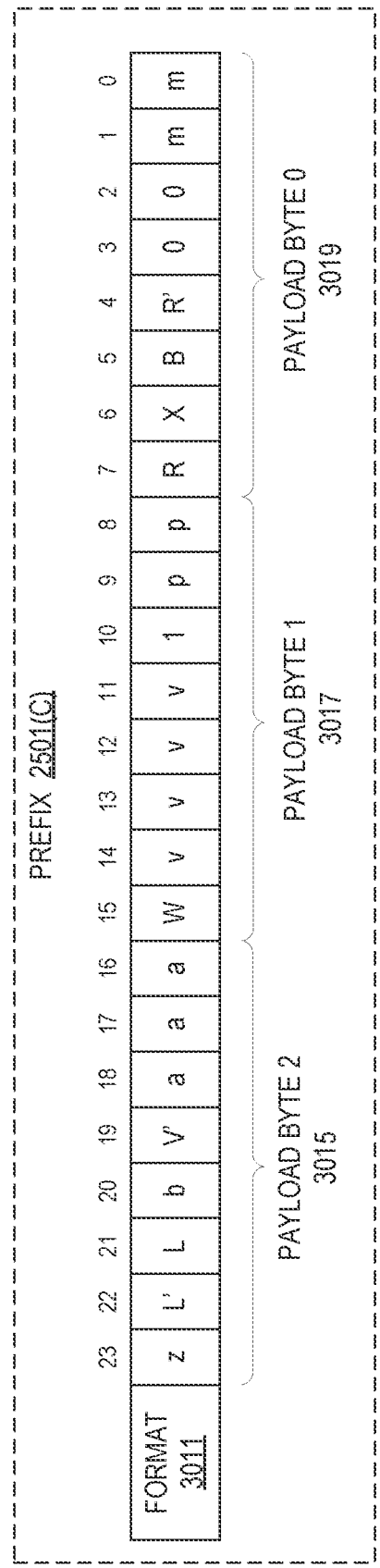
FIG. 30 illustrates examples of a third prefix.

An example of a format for an integer prefix sum instruction is VPSCANADD{S}{B, W, D, Q} DST, SRC1, SRC2. In some examples, VPSCANADD is the base opcode mnemonic of the instruction which may be supplemented as detailed above. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for an integer prefix sum instruction is VPSCANADD{S}{B, W, D, Q} {k} DST, SRC1, SRC2. In some examples, VPSCANADD is the base opcode mnemonic of the instruction which may be supplemented as detailed above. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by bits 16-18 (or "aaa") of payload byte 2 3015 of prefix 2501(C).

In this illustration, a first packed data source (SRC1) 103 and a second packed data source (SRC2) 101 are provided (note that first and second source may not align with the preceding description—that is they may be flipped). As shown, execution circuitry 109 includes at least one integer adder circuit such as 121-127. While illustration shows N integer adders, in some examples, the same adder is re-used multiple times and this illustrates a logical implementation. In some examples, the execution circuitry 109 is a part of a pipeline execution (such an execute stage 2216). In some examples, the execution circuitry 109 is a part of, or comprises, execution unit(s) circuitry 2262 and/or execution circuitry 1209. The execution circuitry 109 comprises combinational logic circuitry in some examples.

In this illustration, a data element from a least significant data element position of SRC1 103 is provided to integer adder[0] 121. In some examples, integer adder[0] 121 also receives a data element from a least significant data element position of SRC2 101 and adds those two data elements together to generate an addition result. In some examples, the result is stored in data element position [0] of DST 131.

The result of that addition is fed into integer adder[1] 123 which, in some examples, receives a data element from a data element position [1] of SRC2 101 and adds the result from integer adder[0] 121 to the data element of data element position [1] of SRC2 101 to be stored in data element position [1] of DST 131, etc.

In some examples, the writemask 105 of the writemask register identified by the instruction is used by writemask/predication circuitry 129 to selectively write the output of each adder into the DST 131. For example, the writemask 105 may comprises a plurality of bits wherein values in corresponding bit positions are used to determine what gets written. In some examples, a 0 for a value in a bit position of the writemask 105 indicates to write a zero. In some examples, a 0 for a value in a bit position of the writemask 105 indicates to leave an existing value in the destination 131. In some examples, the writemask 105 is not a bit mask and which bit positions are used for masking (or predicating) are dependent upon the size of the writemask/predication register and data elements to be writemasked/predicated.

In some examples, the writemask 105 of the writemask register identified by the instruction is used to selectively mask out inputs into each adder using element masking circuitry 121. For example, the writemask 105 may comprise a plurality of bits wherein values in corresponding bit positions are used to determine what data element positions of the second source 101 are to be provided to the adders. In some examples, a 0 for a value in a bit position of the writemask 105 indicates to not provide a data element in a corresponding data element position of the second source 101. For example, when the writemask[0] is 0, in some instances the data element of SRC2[0] is not fed to adder 121.

As noted above, the datatype and size may vary depending on the opcode, etc. In some examples, a decoder and/or scheduler provides this information (as control 141) to the execution circuitry 109 that allows for the proper execution unit type (e.g., integer adder) to be used. In some examples, operation control circuitry 143 configures the execution circuitry 109 according to that control information 141 to use one or more integer adders instead of other ALU circuits 145 such as Boolean logic circuits, etc. In some examples, the operation control circuitry 143 is external to the execution circuitry 109 such as a part of a scheduler such as scheduler 2256.

Figure 2:
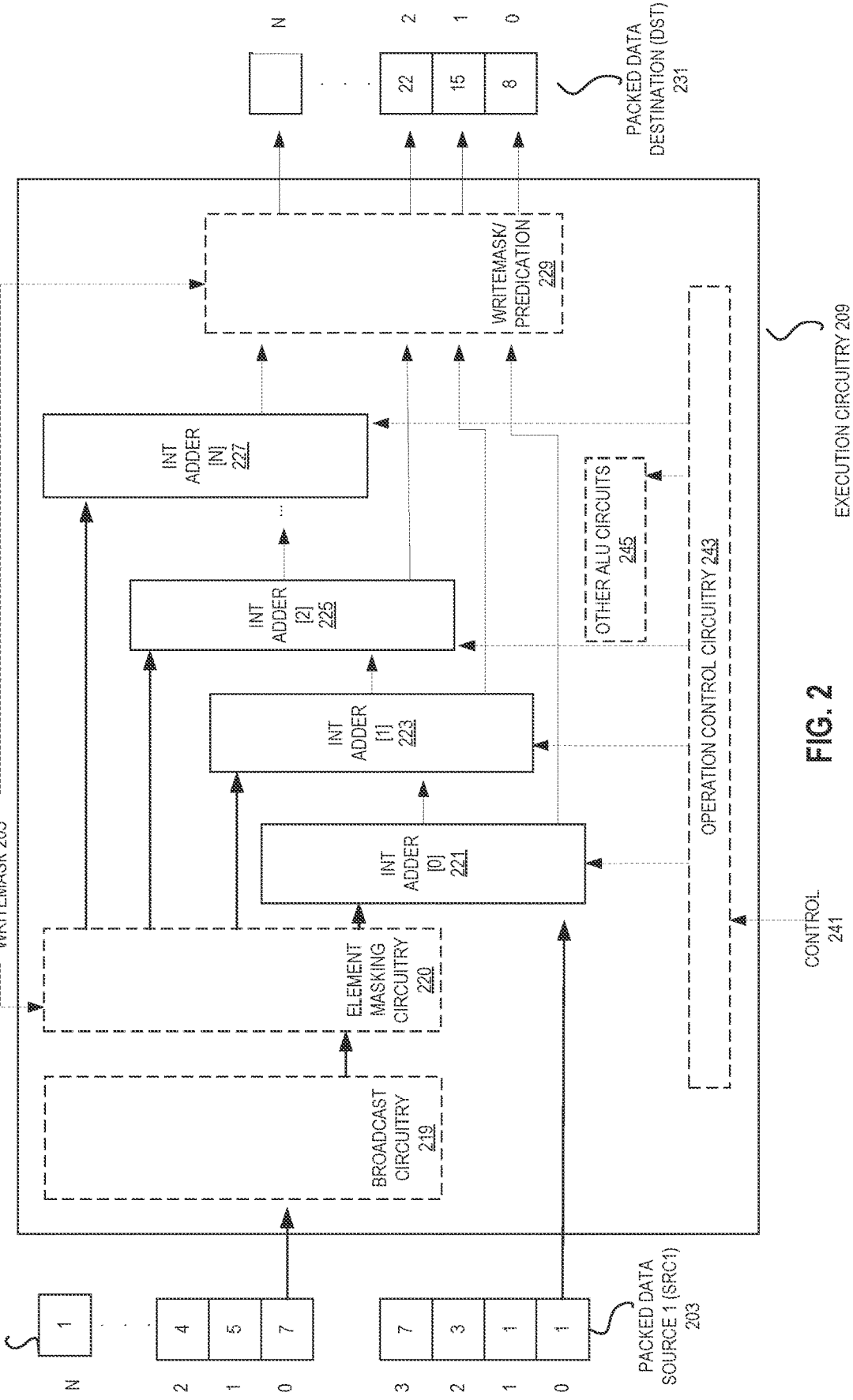
FIG. 2 illustrates exemplary executions of an integer prefix sum instruction.

FIG. 2 illustrates exemplary executions of an integer prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on. In this example, the opcode mnemonic may include such an identification with B, W, D, or Q. In some examples, the opcode indicates if the addition is to be signed or not. In this example, the opcode mnemonic may include an "S" for signed (and in some examples a "U" for unsigned).

An example of a format for an integer prefix sum instruction is VPSCANADD{S}{B, W, D, Q} DST, SRC1, SRC2. In some examples, VPSCANADD is the base opcode mnemonic of the instruction which may be supplemented as detailed above. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for an integer prefix sum instruction is VPSCANADD{S}{B, W, D, Q} {k} DST, SRC1, SRC2. In some examples, VPSCANADD is the base opcode mnemonic of the instruction which may be supplemented as detailed above. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by bits 16-18 (or "aaa") of payload byte 2 3015 of prefix 2501(C).

In this illustration, a first packed data source (SRC1) 203 and a second packed data source (SRC2) 201 are provided (note that first and second source may not align with the preceding description—that is they may be flipped). As shown, execution circuitry 209 includes at least one integer adder circuit such as 221-227. While illustration shows N integer adders, in some examples, the same adder is re-used multiple times, and this illustrates a logical implementation. In some examples, the execution circuitry 209 is a part of a pipeline execution (such an execute stage 2216). In some examples, the execution circuitry 209 is a part of, or comprises, execution unit(s) circuitry 2262 and/or execution circuitry 1209. The execution circuitry 209 comprises combinational logic circuitry in some examples.

In this illustration, a data element from a least significant data element position of SRC1 203 is provided to integer adder[0] 221. In some examples, integer adder[0] 221 also receives a data element from a least significant data element position of SRC2 201 and adds those two data elements together to generate an addition result. In some examples, the result is stored in data element position [0] of DST 231.

The result of that addition is fed into integer adder[1] 223 which, in some examples, receives a data element from a data element position [1] of SRC2 201 and adds the result from integer adder[0] 221 to the data element of data element position [1] of SRC2 201 to be stored in data element position [1] of DST 231, etc.

In some examples, the writemask 205 of the writemask register identified by the instruction is used by writemask/predication circuitry 229 to selectively write the output of each adder into the DST 231. For example, the writemask 205 may comprises a plurality of bits wherein values in corresponding bit positions are used to determine what gets written. In some examples, a 0 for a value in a bit position of the writemask 205 indicates to write a zero. In some examples, a 0 for a value in a bit position of the writemask 205 indicates to leave an existing value in the destination 231. In some examples, the writemask 205 is not a bit mask and which bit positions are used for masking (or predicating) are dependent upon the size of the writemask/predication register and data elements to be writemasked/predicated.

In some examples, broadcast circuitry 219 is used to broadcast a particular data element of the second source 201 under conditions (e.g., an indication to use broadcasting is present in a prefix of the instruction and the second source 201 is memory).

In some examples, the writemask 205 of the writemask register identified by the instruction is used to selectively mask out inputs into each adder using element masking circuitry 221. For example, the writemask 205 may comprise a plurality of bits wherein values in corresponding bit positions are used to determine what data element positions of the second source 201 are to be provided to the adders. In some examples, a 0 for a value in a bit position of the writemask 205 indicates to not provide a data element in a corresponding data element position of the second source 201. For example, when the writemask[0] is 0, in some instances the data element of SRC2[0] is not fed to adder 221.

As noted above, the datatype and size may vary depending on the opcode, etc. In some examples, a decoder and/or scheduler provides this information (as control 241) to the execution circuitry 209 that allows for the proper execution unit type (e.g., integer adder) to be used. In some examples, operation control circuitry 243 configures the execution circuitry 209 according to that control information 241 to use one or more integer adders instead of other ALU circuits 245 such as Boolean logic circuits, etc. In some examples, the operation control circuitry 243 is external to the execution circuitry 209 such as a part of a scheduler such as scheduler 2256.

Figure 3:
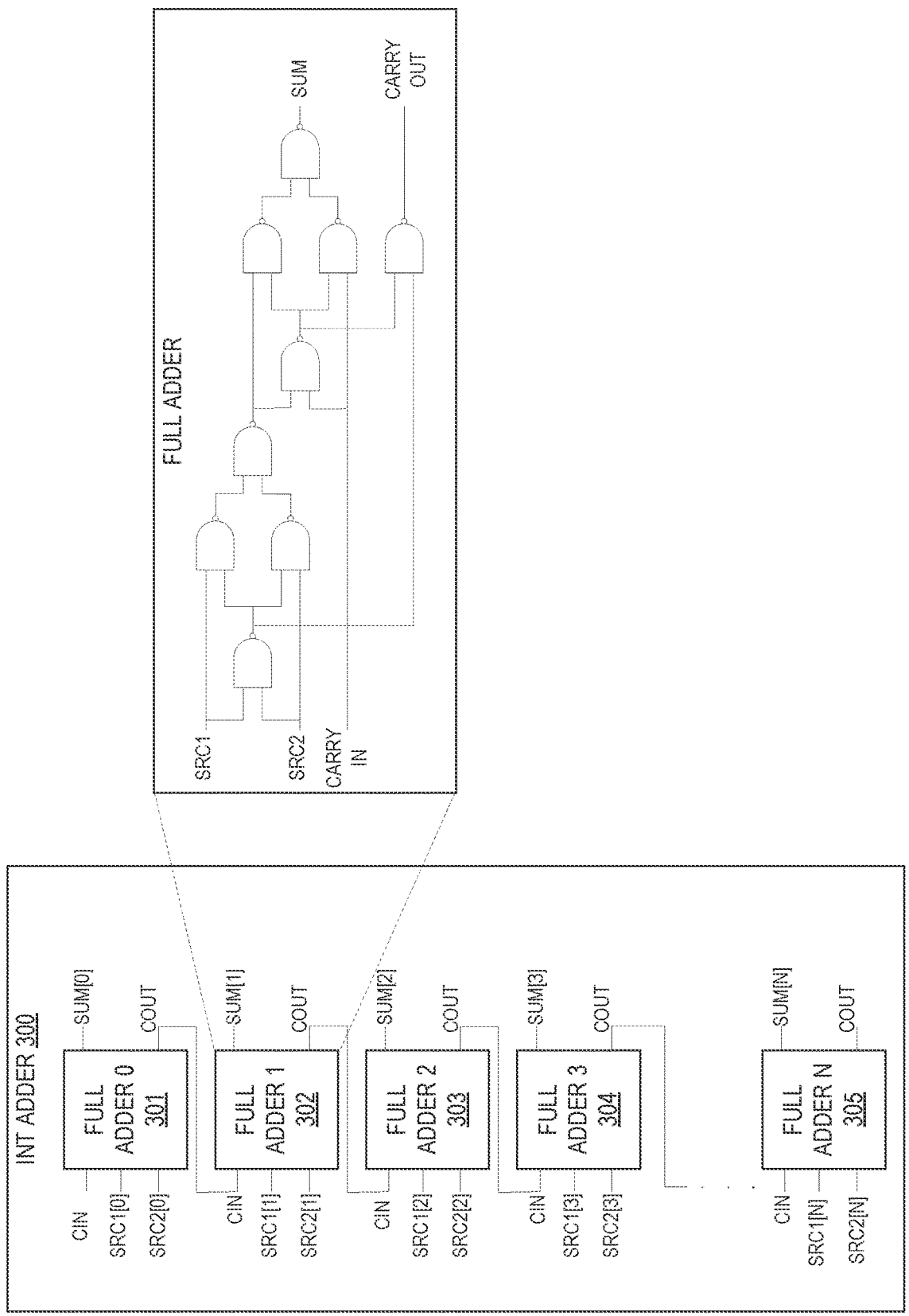
FIG. 3 illustrates examples of an integer adder.

FIG. 3 illustrates examples of an integer adder. As shown, an integer adder 300 includes a plurality of full adders 301-05 which each add two bits (one from each source) and consider a carry in for that addition. An example of a full adder in NAND-gate form is also shown. Note that this is merely illustrative and other types of combinational logic may be used.

Figure 4:
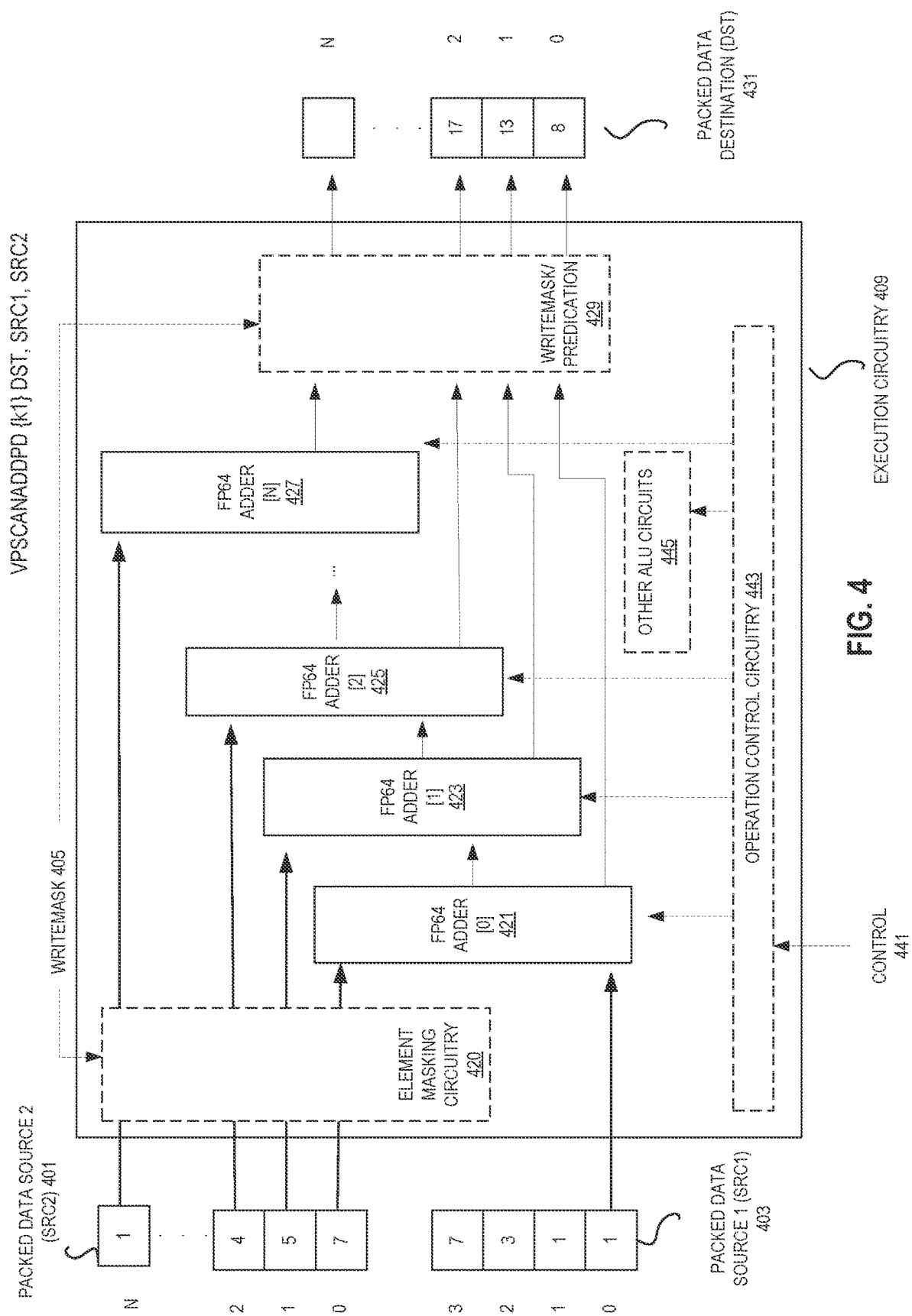
FIG. 4 illustrates exemplary executions of a double precision floating point prefix sum instruction.

FIG. 4 illustrates exemplary executions of a double precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on which in this case is double precision floating point (FP64) shown as PD.

An example of a format for a double precision floating point prefix sum instruction is VPSCANADDPD DST, SRC1, SRC2. In some examples, VPSCANADD is the base opcode mnemonic of the instruction which may be supplemented as detailed above adding PD for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a double precision floating point prefix sum instruction is VPSCANADDPD {k} DST, SRC1, SRC2. In some examples, VPSCANADD is the base opcode mnemonic of the instruction which may be supplemented as detailed above adding PD for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by bits 16-18 (or "aaa") of payload byte 2 3015 of prefix 2501(C).

In this illustration, a first packed data source (SRC1) 403 and a second packed data source (SRC2) 401 are provided (note that first and second source may not align with the preceding description—that is they may be flipped). As shown, execution circuitry 409 includes at least one double precision floating point adder circuit such as 421-427. While illustration shows N double precision floating point adders, in some examples, the same adder is re-used multiple times, and this illustrates a logical implementation. In some examples, the execution circuitry 409 is a part of a pipeline execution (such an execute stage 2216). In some examples, the execution circuitry 409 is a part of, or comprises, execution unit(s) circuitry 2262 and/or execution circuitry 1209. The execution circuitry 409 comprises combinational logic circuitry in some examples.

In this illustration, a data element from a least significant data element position of SRC1 403 is provided to double precision floating point adder[0] 421. In some examples, double precision floating point adder[0] 421 also receives a data element from a least significant data element position of SRC2 401 and adds those two data elements together to generate an addition result. In some examples, the result is stored in data element position [0] of DST 431.

The result of that addition is fed into double precision floating point adder[1] 423 which, in some examples, receives a data element from a data element position [1] of SRC2 401 and adds the result from double precision floating point adder[0] 421 to the data element of data element position [1] of SRC2 401 to be stored in data element position [1] of DST 431, etc.

In some examples, the writemask 405 of the writemask register identified by the instruction is used by writemask/predication circuitry 429 to selectively write the output of each adder into the DST 431. For example, the writemask 405 may comprises a plurality of bits wherein values in corresponding bit positions are used to determine what gets written. In some examples, a 0 for a value in a bit position of the writemask 405 indicates to write a zero. In some examples, a 0 for a value in a bit position of the writemask 405 indicates to leave an existing value in the destination 431. In some examples, the writemask 405 is not a bit mask and which bit positions are used for masking (or predicating) are dependent upon the size of the writemask/predication register and data elements to be writemasked/predicated.

In some examples, the writemask 405 of the writemask register identified by the instruction is used to selectively mask out inputs into each adder using element masking circuitry 421. For example, the writemask 405 may comprise a plurality of bits wherein values in corresponding bit positions are used to determine what data element positions of the second source 401 are to be provided to the adders. In some examples, a 0 for a value in a bit position of the writemask 405 indicates to not provide a data element in a corresponding data element position of the second source 401. For example, when the writemask[0] is 0, in some instances the data element of SRC2[0] is not fed to adder 421.

As noted above, the datatype and size may vary depending on the opcode, etc. In some examples, a decoder and/or scheduler provides this information (as control 441) to the execution circuitry 409 that allows for the proper execution unit type (e.g., double precision floating point adder) to be used. In some examples, operation control circuitry 443 configures the execution circuitry 409 according to that control information 441 to use one or more double precision floating point adders instead of other ALU circuits 445 such as Boolean logic circuits, etc. In some examples, the operation control circuitry 443 is external to the execution circuitry 409 such as a part of a scheduler such as scheduler 2256.

Figure 5:
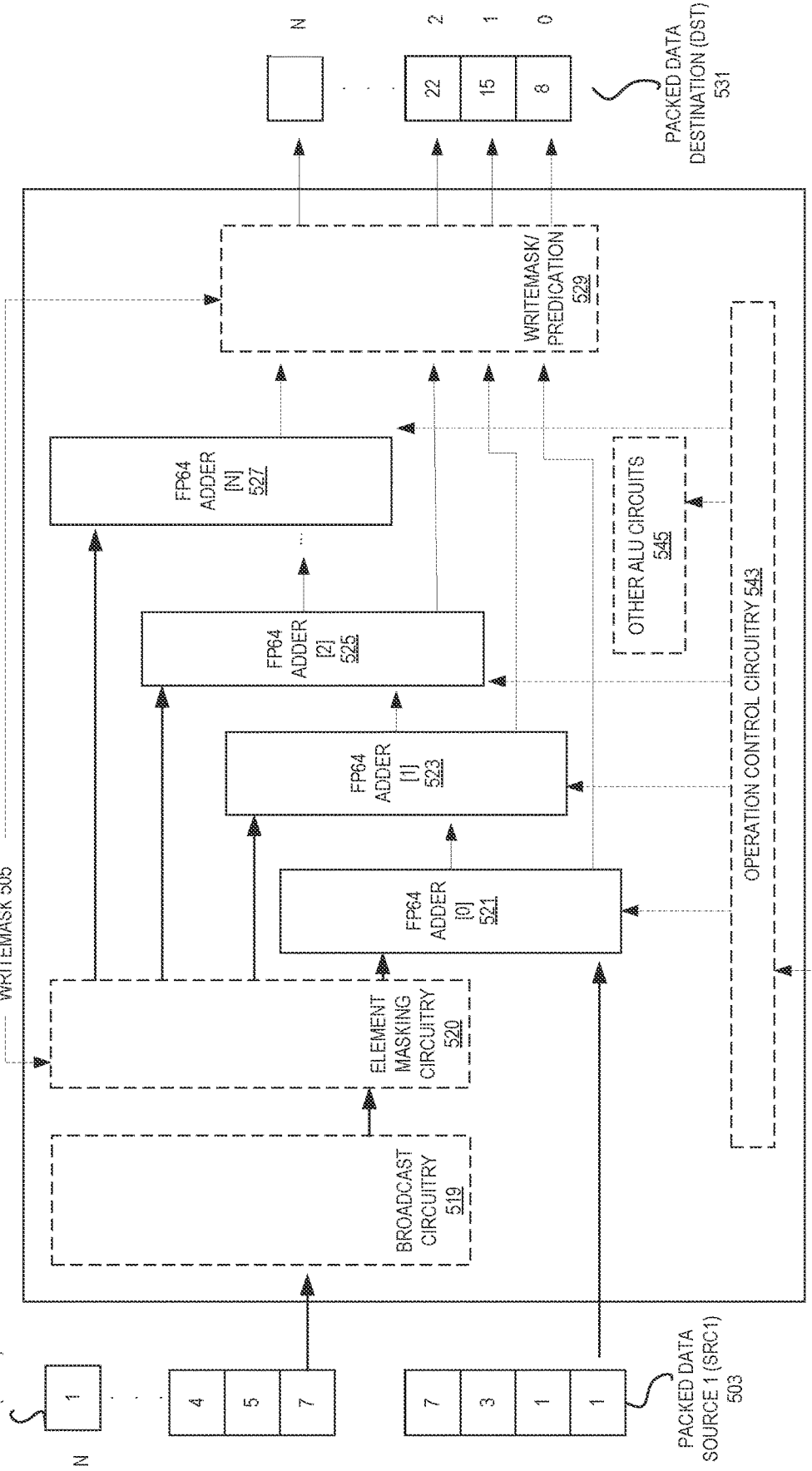
FIG. 5 illustrates exemplary executions of a double precision floating point prefix sum instruction.

FIG. 5 illustrates exemplary executions of a double precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on.

An example of a format for a double precision floating point prefix sum instruction is VPSCANADDPD DST, SRC1, SRC2. In some examples, VPSCANADD is the base opcode mnemonic of the instruction which may be supplemented as detailed above adding PD for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a double precision floating point prefix sum instruction is VPSCANADDPD {k} DST, SRC1, SRC2. In some examples, VPSCANADD is the base opcode mnemonic of the instruction which may be supplemented as detailed above adding PD for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by bits 16-18 (or "aaa") of payload byte 2 3015 of prefix 2501(C).

In this illustration, a first packed data source (SRC1) 503 and a second packed data source (SRC2) 501 are provided (note that first and second source may not align with the preceding description—that is they may be flipped). As shown, execution circuitry 509 includes at least one double precision floating point adder circuit such as 521-527. While illustration shows N double precision floating point adders, in some examples, the same adder is re-used multiple times, and this illustrates a logical implementation. In some examples, the execution circuitry 509 is a part of a pipeline execution (such an execute stage 2216). In some examples, the execution circuitry 509 is a part of, or comprises, execution unit(s) circuitry 2262 and/or execution circuitry 1209. The execution circuitry 509 comprises combinational logic circuitry in some examples.

In this illustration, a data element from a least significant data element position of SRC1 503 is provided to double precision floating point adder[0] 521. In some examples, double precision floating point adder[0] 521 also receives a data element from a least significant data element position of SRC2 501 and adds those two data elements together to generate an addition result. In some examples, the result is stored in data element position [0] of DST 531.

The result of that addition is fed into double precision floating point adder[1] 523 which, in some examples, receives a data element from a data element position [1] of SRC2 501 and adds the result from double precision floating point adder[0] 521 to the data element of data element position [1] of SRC2 501 to be stored in data element position [1] of DST 531, etc.

In some examples, the writemask 505 of the writemask register identified by the instruction is used by writemask/predication circuitry 529 to selectively write the output of each adder into the DST 531. For example, the writemask 505 may comprises a plurality of bits wherein values in corresponding bit positions are used to determine what gets written. In some examples, a 0 for a value in a bit position of the writemask 505 indicates to write a zero. In some examples, a 0 for a value in a bit position of the writemask 505 indicates to leave an existing value in the destination 531. In some examples, the writemask 505 is not a bit mask and which bit positions are used for masking (or predicating) are dependent upon the size of the writemask/predication register and data elements to be writemasked/predicated.

In some examples, broadcast circuitry 519 is used to broadcast a particular data element of the second source 501 under conditions (e.g., an indication to use broadcasting is present in a prefix of the instruction and the second source 501 is memory).

In some examples, the writemask 505 of the writemask register identified by the instruction is used to selectively mask out inputs into each adder using element masking circuitry 521. For example, the writemask 505 may comprise a plurality of bits wherein values in corresponding bit positions are used to determine what data element positions of the second source 501 are to be provided to the adders. In some examples, a 0 for a value in a bit position of the writemask 505 indicates to not provide a data element in a corresponding data element position of the second source 501. For example, when the writemask[0] is 0, in some instances the data element of SRC2[0] is not fed to adder 521.

As noted above, the datatype and size may vary depending on the opcode, etc. In some examples, a decoder and/or scheduler provides this information (as control 541) to the execution circuitry 509 that allows for the proper execution unit type (e.g., double precision floating point adder) to be used. In some examples, operation control circuitry 543 configures the execution circuitry 509 according to that control information 541 to use one or more double precision floating point adders instead of other ALU circuits 545 such as Boolean logic circuits, etc. In some examples, the operation control circuitry 543 is external to the execution circuitry 509 such as a part of a scheduler such as scheduler 2256.

Figure 6:
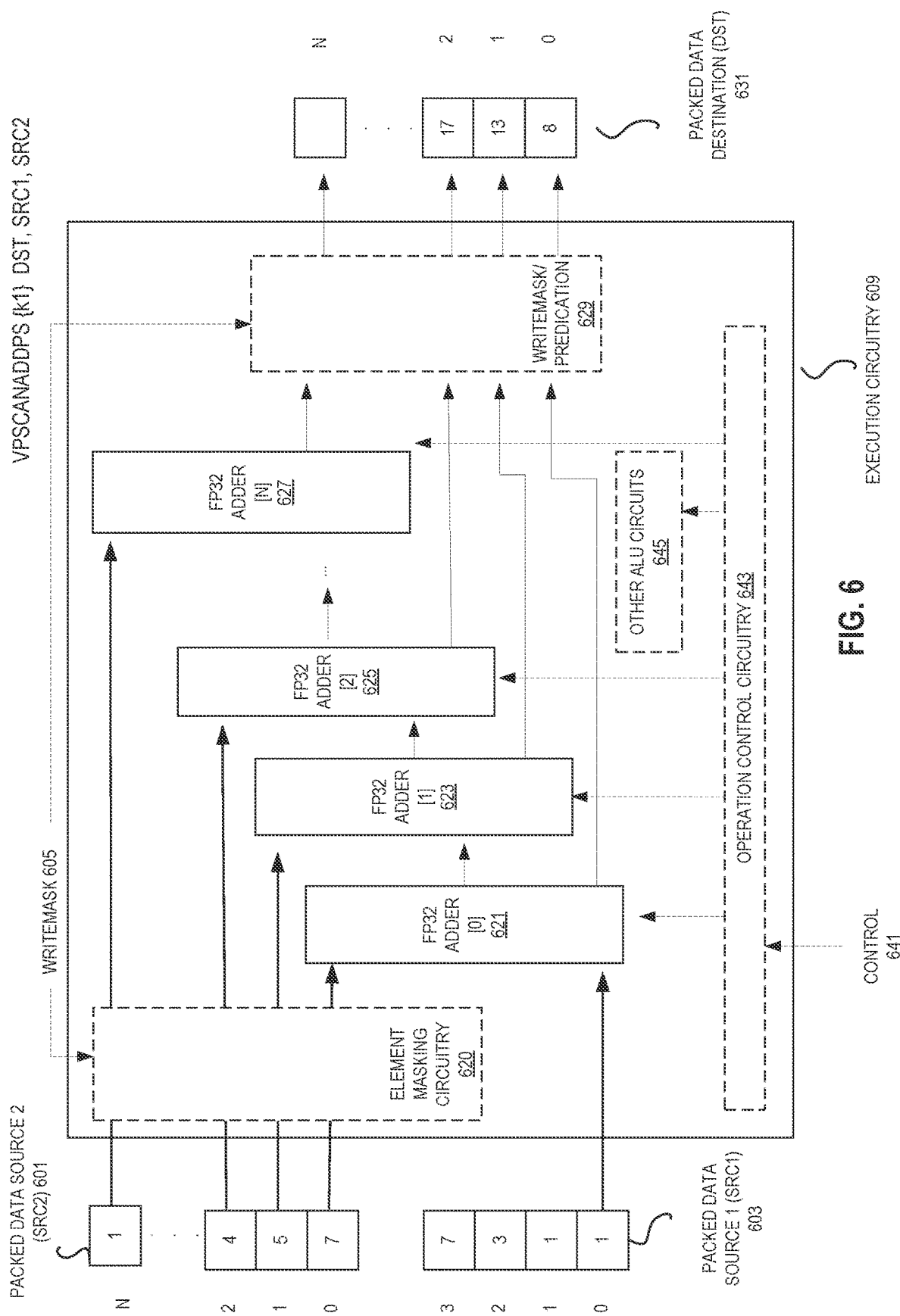
FIG. 6 illustrates exemplary executions of a single precision floating point prefix sum instruction.

FIG. 6 illustrates exemplary executions of a single precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on which in this case is single precision floating point (FP64) shown as PS.

An example of a format for a single precision floating point prefix sum instruction is VPSCANADDPS DST, SRC1, SRC2. In some examples, VPSCANADD is the base opcode mnemonic of the instruction which may be supplemented as detailed above adding PS for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a single precision floating point prefix sum instruction is VPSCANADDPS {k} DST, SRC1, SRC2. In some examples, VPSCANADD is the base opcode mnemonic of the instruction which may be supplemented as detailed above adding PS for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by bits 16-18 (or "aaa") of payload byte 2 3015 of prefix 2501(C).

In this illustration, a first packed data source (SRC1) 603 and a second packed data source (SRC2) 601 are provided (note that first and second source may not align with the preceding description—that is they may be flipped). As shown, execution circuitry 609 includes at least one single precision floating point adder circuit such as 621-627. While illustration shows N single precision floating point adders, in some examples, the same adder is re-used multiple times, and this illustrates a logical implementation. In some examples, the execution circuitry 609 is a part of a pipeline execution (such an execute stage 2216). In some examples, the execution circuitry 609 is a part of, or comprises, execution unit(s) circuitry 2262 and/or execution circuitry 1209. The execution circuitry 609 comprises combinational logic circuitry in some examples.

In this illustration, a data element from a least significant data element position of SRC1 603 is provided to single precision floating point adder[0] 621. In some examples, single precision floating point adder[0] 621 also receives a data element from a least significant data element position of SRC2 601 and adds those two data elements together to generate an addition result. In some examples, the result is stored in data element position [0] of DST 631.

The result of that addition is fed into single precision floating point adder[1] 623 which, in some examples, receives a data element from a data element position [1] of SRC2 601 and adds the result from single precision floating point adder[0] 621 to the data element of data element position [1] of SRC2 601 to be stored in data element position [1] of DST 631, etc.

In some examples, the writemask 605 of the writemask register identified by the instruction is used by writemask/predication circuitry 629 to selectively write the output of each adder into the DST 631. For example, the writemask 605 may comprises a plurality of bits wherein values in corresponding bit positions are used to determine what gets written. In some examples, a 0 for a value in a bit position of the writemask 605 indicates to write a zero. In some examples, a 0 for a value in a bit position of the writemask 605 indicates to leave an existing value in the destination 631. In some examples, the writemask 605 is not a bit mask and which bit positions are used for masking (or predicating) are dependent upon the size of the writemask/predication register and data elements to be writemasked/predicated.

In some examples, the writemask 605 of the writemask register identified by the instruction is used to selectively mask out inputs into each adder using element masking circuitry 621. For example, the writemask 605 may comprise a plurality of bits wherein values in corresponding bit positions are used to determine what data element positions of the second source 601 are to be provided to the adders. In some examples, a 0 for a value in a bit position of the writemask 605 indicates to not provide a data element in a corresponding data element position of the second source 601. For example, when the writemask[0] is 0, in some instances the data element of SRC2[0] is not fed to adder 621.

As noted above, the datatype and size may vary depending on the opcode, etc. In some examples, a decoder and/or scheduler provides this information (as control 641) to the execution circuitry 609 that allows for the proper execution unit type (e.g., single precision floating point adder) to be used. In some examples, operation control circuitry 643 configures the execution circuitry 609 according to that control information 641 to use one or more single precision floating point adders instead of other ALU circuits 645 such as Boolean logic circuits, etc. In some examples, the operation control circuitry 643 is external to the execution circuitry 609 such as a part of a scheduler such as scheduler 2256.

Figure 7:
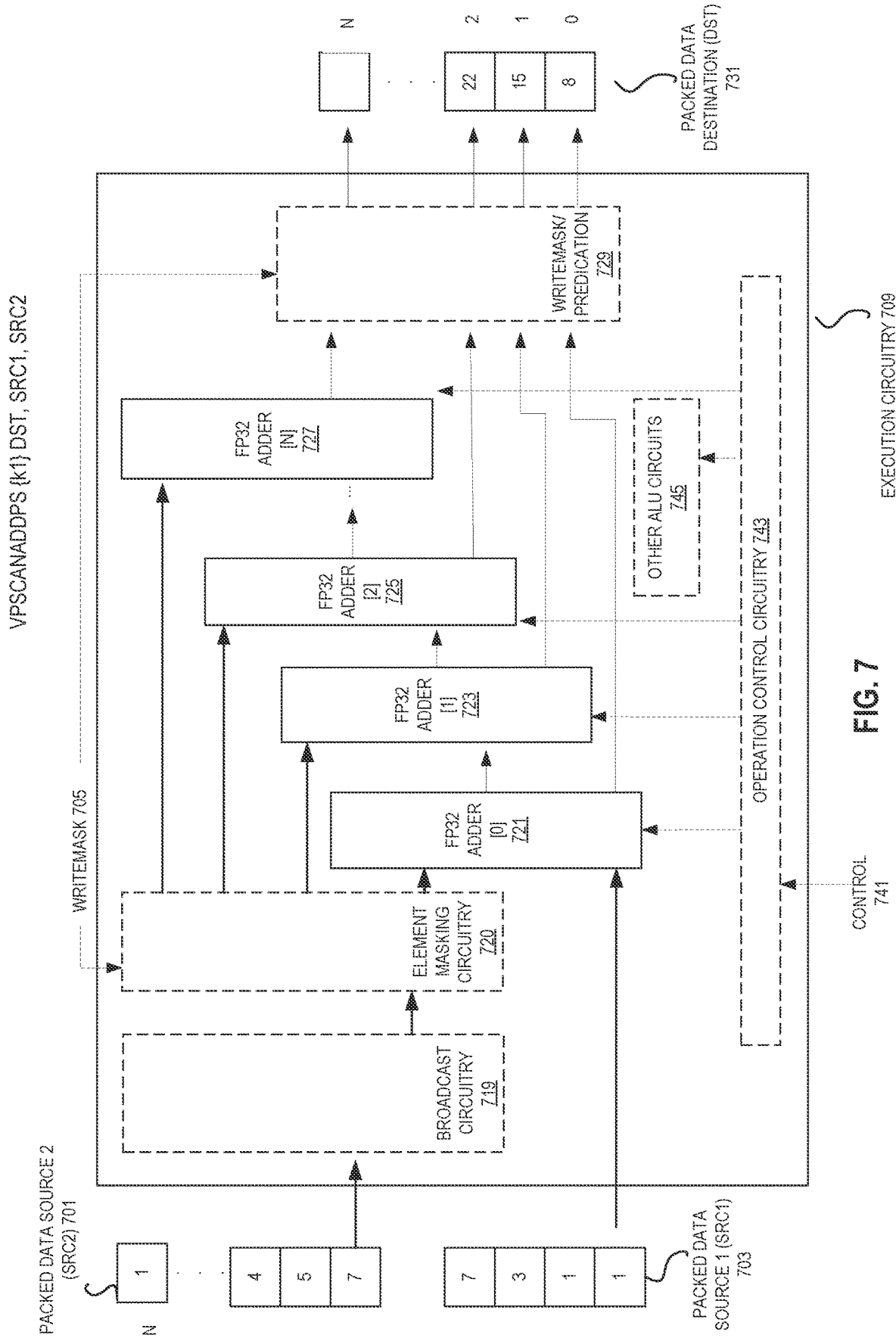
FIG. 7 illustrates exemplary executions of a single precision floating point prefix sum instruction.

FIG. 7 illustrates exemplary executions of a single precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on.

An example of a format for a single precision floating point prefix sum instruction is VPSCANADDPS DST, SRC1, SRC2. In some examples, VPSCANADD is the base opcode mnemonic of the instruction which may be supplemented as detailed above adding PS for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a single precision floating point prefix sum instruction is VPSCANADDPS {k} DST, SRC1, SRC2. In some examples, VPSCANADD is the base opcode mnemonic of the instruction which may be supplemented as detailed above adding PS for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by 16-18 (or "aaa") of payload byte 2 3015 of prefix 2501(C).

In this illustration, a first packed data source (SRC1) 703 and a second packed data source (SRC2) 701 are provided (note that first and second source may not align with the preceding description—that is they may be flipped). As shown, execution circuitry 709 includes at least one single precision floating point adder circuit such as 721-727. While illustration shows N single precision floating point adders, in some examples, the same adder is re-used multiple times, and this illustrates a logical implementation. In some examples, the execution circuitry 709 is a part of a pipeline execution (such an execute stage 2216). In some examples, the execution circuitry 709 is a part of, or comprises, execution unit(s) circuitry 2262 and/or execution circuitry 1209. The execution circuitry 709 comprises combinational logic circuitry in some examples.

In this illustration, a data element from a least significant data element position of SRC1 703 is provided to single precision floating point adder[0] 721. In some examples, single precision floating point adder[0] 721 also receives a data element from a least significant data element position of SRC2 701 and adds those two data elements together to generate an addition result. In some examples, the result is stored in data element position [0] of DST 731.

The result of that addition is fed into single precision floating point adder[1] 723 which, in some examples, receives a data element from a data element position [1] of SRC2 701 and adds the result from single precision floating point adder[0] 721 to the data element of data element position [1] of SRC2 701 to be stored in data element position [1] of DST 731, etc.

In some examples, the writemask 705 of the writemask register identified by the instruction is used by writemask/predication circuitry 729 to selectively write the output of each adder into the DST 731. For example, the writemask 705 may comprises a plurality of bits wherein values in corresponding bit positions are used to determine what gets written. In some examples, a 0 for a value in a bit position of the writemask 705 indicates to write a zero. In some examples, a 0 for a value in a bit position of the writemask 705 indicates to leave an existing value in the destination 731. In some examples, the writemask 705 is not a bit mask and which bit positions are used for masking (or predicating) are dependent upon the size of the writemask/predication register and data elements to be writemasked/predicated.

In some examples, broadcast circuitry 719 is used to broadcast a particular data element of the second source 701 under conditions (e.g., an indication to use broadcasting is present in a prefix of the instruction and the second source 701 is memory).

In some examples, the writemask 705 of the writemask register identified by the instruction is used to selectively mask out inputs into each adder using element masking circuitry 721. For example, the writemask 705 may comprise a plurality of bits wherein values in corresponding bit positions are used to determine what data element positions of the second source 701 are to be provided to the adders. In some examples, a 0 for a value in a bit position of the writemask 705 indicates to not provide a data element in a corresponding data element position of the second source 701. For example, when the writemask[0] is 0, in some instances the data element of SRC2[0] is not fed to adder 721.

As noted above, the datatype and size may vary depending on the opcode, etc. In some examples, a decoder and/or scheduler provides this information (as control 741) to the execution circuitry 709 that allows for the proper execution unit type (e.g., single precision floating point adder) to be used. In some examples, operation control circuitry 743 configures the execution circuitry 709 according to that control information 741 to use one or more single precision floating point adders instead of other ALU circuits 745 such as Boolean logic circuits, etc. In some examples, the operation control circuitry 743 is external to the execution circuitry 709 such as a part of a scheduler such as scheduler 2256.

Figure 8:
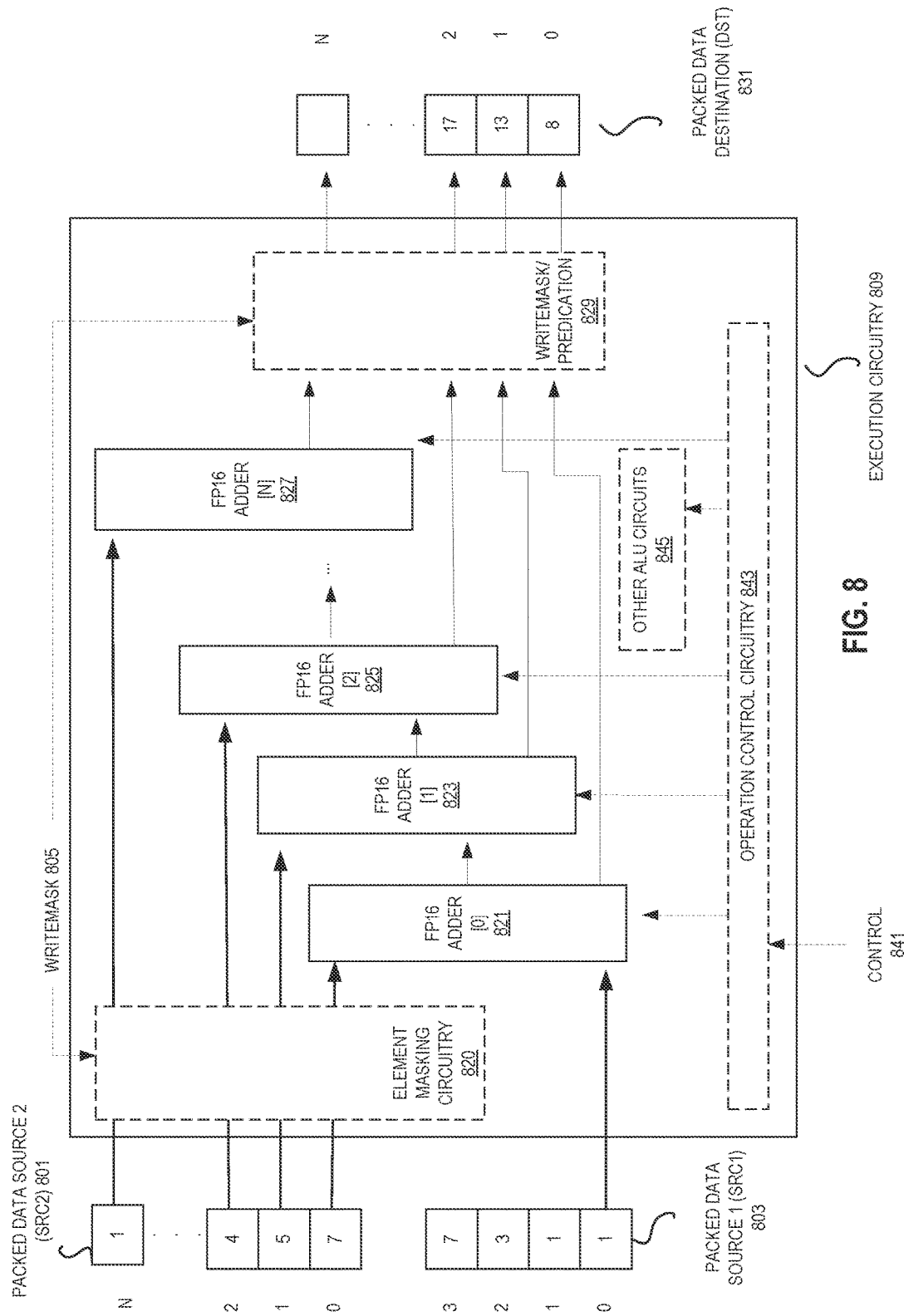
FIG. 8 illustrates exemplary executions of a half precision floating point prefix sum instruction.

FIG. 8 illustrates exemplary executions of a half precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on which in this case is half precision floating point (FP64) shown as PS.

An example of a format for a half precision floating point prefix sum instruction is VPSCANADDPH DST, SRC1, SRC2. In some examples, VPSCANADD is the base opcode mnemonic of the instruction which may be supplemented as detailed above adding PH for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a half precision floating point prefix sum instruction is VPSCANADDPH {k} DST, SRC1, SRC2. In some examples, VPSCANADD is the base opcode mnemonic of the instruction which may be supplemented as detailed above adding PH for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by 16-18 (or "aaa") of payload byte 2 3015 of prefix 2501(C).

In this illustration, a first packed data source (SRC1) 803 and a second packed data source (SRC2) 801 are provided (note that first and second source may not align with the preceding description—that is they may be flipped). As shown, execution circuitry 809 includes at least one half precision floating point adder circuit such as 821-827. While illustration shows N half precision floating point adders, in some examples, the same adder is re-used multiple times, and this illustrates a logical implementation. In some examples, the execution circuitry 809 is a part of a pipeline execution (such an execute stage 2216). In some examples, the execution circuitry 809 is a part of, or comprises, execution unit(s) circuitry 2262 and/or execution circuitry 1209. The execution circuitry 809 comprises combinational logic circuitry in some examples.

In this illustration, a data element from a least significant data element position of SRC1 803 is provided to half precision floating point adder[0] 821. In some examples, half precision floating point adder[0] 821 also receives a data element from a least significant data element position of SRC2 801 and adds those two data elements together to generate an addition result. In some examples, the result is stored in data element position [0] of DST 831.

The result of that addition is fed into half precision floating point adder[1] 823 which, in some examples, receives a data element from a data element position [1] of SRC2 801 and adds the result from half precision floating point adder[0] 821 to the data element of data element position [1] of SRC2 801 to be stored in data element position [1] of DST 831, etc.

In some examples, the writemask 805 of the writemask register identified by the instruction is used by writemask/predication circuitry 829 to selectively write the output of each adder into the DST 831. For example, the writemask 805 may comprises a plurality of bits wherein values in corresponding bit positions are used to determine what gets written. In some examples, a 0 for a value in a bit position of the writemask 805 indicates to write a zero. In some examples, a 0 for a value in a bit position of the writemask 805 indicates to leave an existing value in the destination 831. In some examples, the writemask 805 is not a bit mask and which bit positions are used for masking (or predicating) are dependent upon the size of the writemask/predication register and data elements to be writemasked/predicated.

In some examples, the writemask 805 of the writemask register identified by the instruction is used to selectively mask out inputs into each adder using element masking circuitry 821. For example, the writemask 805 may comprise a plurality of bits wherein values in corresponding bit positions are used to determine what data element positions of the second source 801 are to be provided to the adders. In some examples, a 0 for a value in a bit position of the writemask 805 indicates to not provide a data element in a corresponding data element position of the second source 801. For example, when the writemask[0] is 0, in some instances the data element of SRC2[0] is not fed to adder 821.

As noted above, the datatype and size may vary depending on the opcode, etc. In some examples, a decoder and/or scheduler provides this information (as control 841) to the execution circuitry 809 that allows for the proper execution unit type (e.g., half precision floating point adder) to be used. In some examples, operation control circuitry 843 configures the execution circuitry 809 according to that control information 841 to use one or more half precision floating point adders instead of other ALU circuits 845 such as Boolean logic circuits, etc. In some examples, the operation control circuitry 843 is external to the execution circuitry 809 such as a part of a scheduler such as scheduler 2256.

Figure 9:
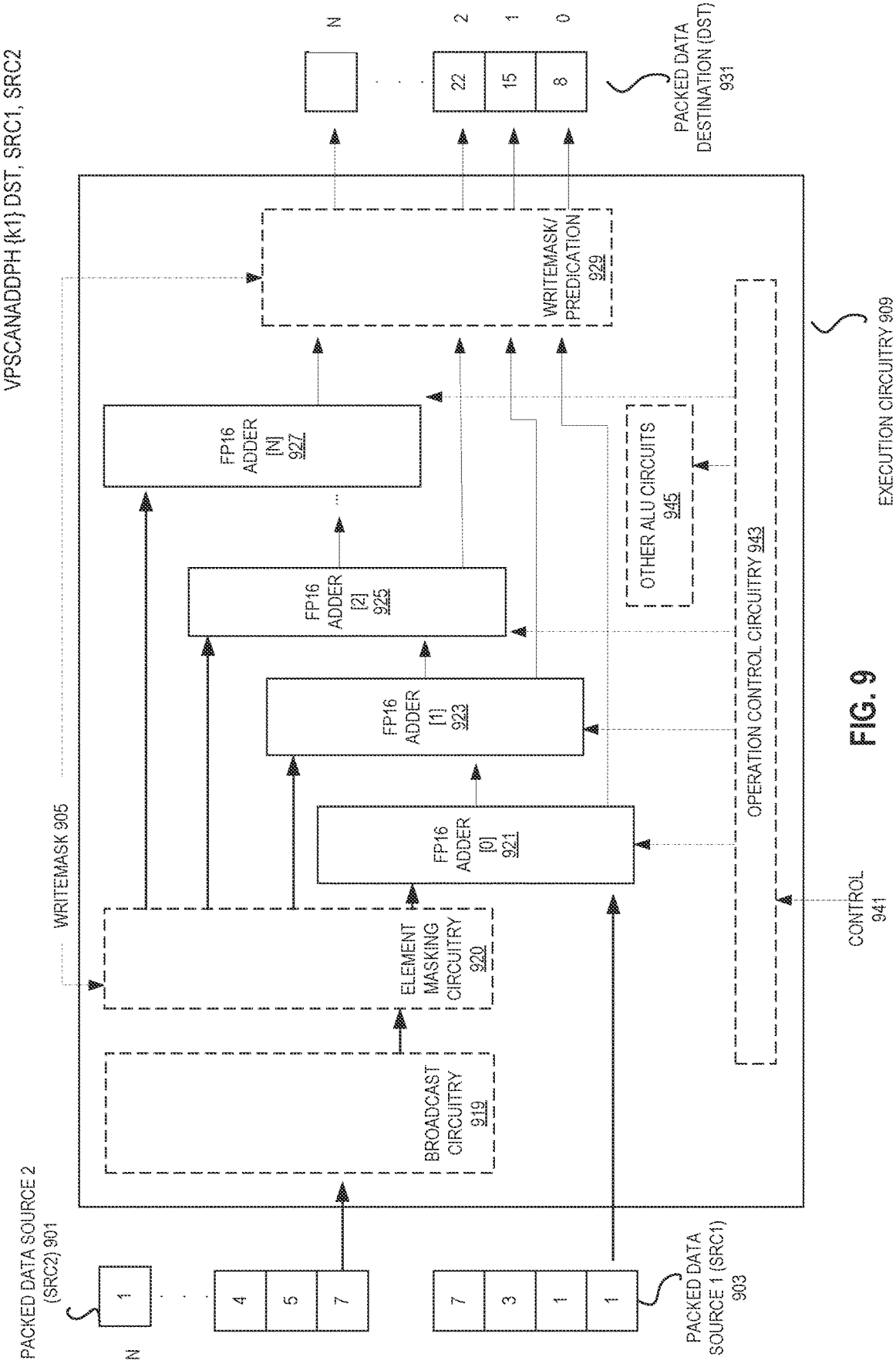
FIG. 9 illustrates exemplary executions of a half precision floating point prefix sum instruction.

FIG. 9 illustrates exemplary executions of a half precision floating point prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on.

An example of a format for a half precision floating point prefix sum instruction is VPSCANADDPH DST, SRC1, SRC2. In some examples, VPSCANADD is the base opcode mnemonic of the instruction which may be supplemented as detailed above adding PH for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a half precision floating point prefix sum instruction is VPSCANADDPH {k} DST, SRC1, SRC2. In some examples, VPSCANADD is the base opcode mnemonic of the instruction which may be supplemented as detailed above adding PH for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by 16-18 (or "aaa") of payload byte 2 3015 of prefix 2501(C).

In this illustration, a first packed data source (SRC1) 903 and a second packed data source (SRC2) 901 are provided (note that first and second source may not align with the preceding description—that is they may be flipped). As shown, execution circuitry 909 includes at least one half precision floating point adder circuit such as 921-927. While illustration shows N half precision floating point adders, in some examples, the same adder is re-used multiple times and this illustrates a logical implementation. In some examples, the execution circuitry 909 is a part of a pipeline execution (such an execute stage 2216). In some examples, the execution circuitry 909 is a part of, or comprises, execution unit(s) circuitry 2262 and/or execution circuitry 1209. The execution circuitry 909 comprises combinational logic circuitry in some examples.

In this illustration, a data element from a least significant data element position of SRC1 903 is provided to half precision floating point adder[0] 921. In some examples, half precision floating point adder[0] 921 also receives a data element from a least significant data element position of SRC2 901 and adds those two data elements together to generate an addition result. In some examples, the result is stored in data element position [0] of DST 931.

The result of that addition is fed into half precision floating point adder[1] 923 which, in some examples, receives a data element from a data element position [1] of SRC2 901 and adds the result from half precision floating point adder[0] 921 to the data element of data element position [1] of SRC2 901 to be stored in data element position [1] of DST 931, etc.

In some examples, the writemask 905 of the writemask register identified by the instruction is used by writemask/predication circuitry 929 to selectively write the output of each adder into the DST 931. For example, the writemask 905 may comprises a plurality of bits wherein values in corresponding bit positions are used to determine what gets written. In some examples, a 0 for a value in a bit position of the writemask 905 indicates to write a zero. In some examples, a 0 for a value in a bit position of the writemask 905 indicates to leave an existing value in the destination 931. In some examples, the writemask 905 is not a bit mask and which bit positions are used for masking (or predicating) are dependent upon the size of the writemask/predication register and data elements to be writemasked/predicated.

In some examples, broadcast circuitry 919 is used to broadcast a particular data element of the second source 901 under conditions (e.g., an indication to use broadcasting is present in a prefix of the instruction and the second source 901 is memory).

In some examples, the writemask 905 of the writemask register identified by the instruction is used to selectively mask out inputs into each adder using element masking circuitry 921. For example, the writemask 905 may comprise a plurality of bits wherein values in corresponding bit positions are used to determine what data element positions of the second source 901 are to be provided to the adders. In some examples, a 0 for a value in a bit position of the writemask 905 indicates to not provide a data element in a corresponding data element position of the second source 901. For example, when the writemask[0] is 0, in some instances the data element of SRC2[0] is not fed to adder 921.

As noted above, the datatype and size may vary depending on the opcode, etc. In some examples, a decoder and/or scheduler provides this information (as control 941) to the execution circuitry 909 that allows for the proper execution unit type (e.g., half precision floating point adder) to be used. In some examples, operation control circuitry 943 configures the execution circuitry 909 according to that control information 941 to use one or more half precision floating point adders instead of other ALU circuits 945 such as Boolean logic circuits, etc. In some examples, the operation control circuitry 943 is external to the execution circuitry 909 such as a part of a scheduler such as scheduler 2256.

Figure 10:
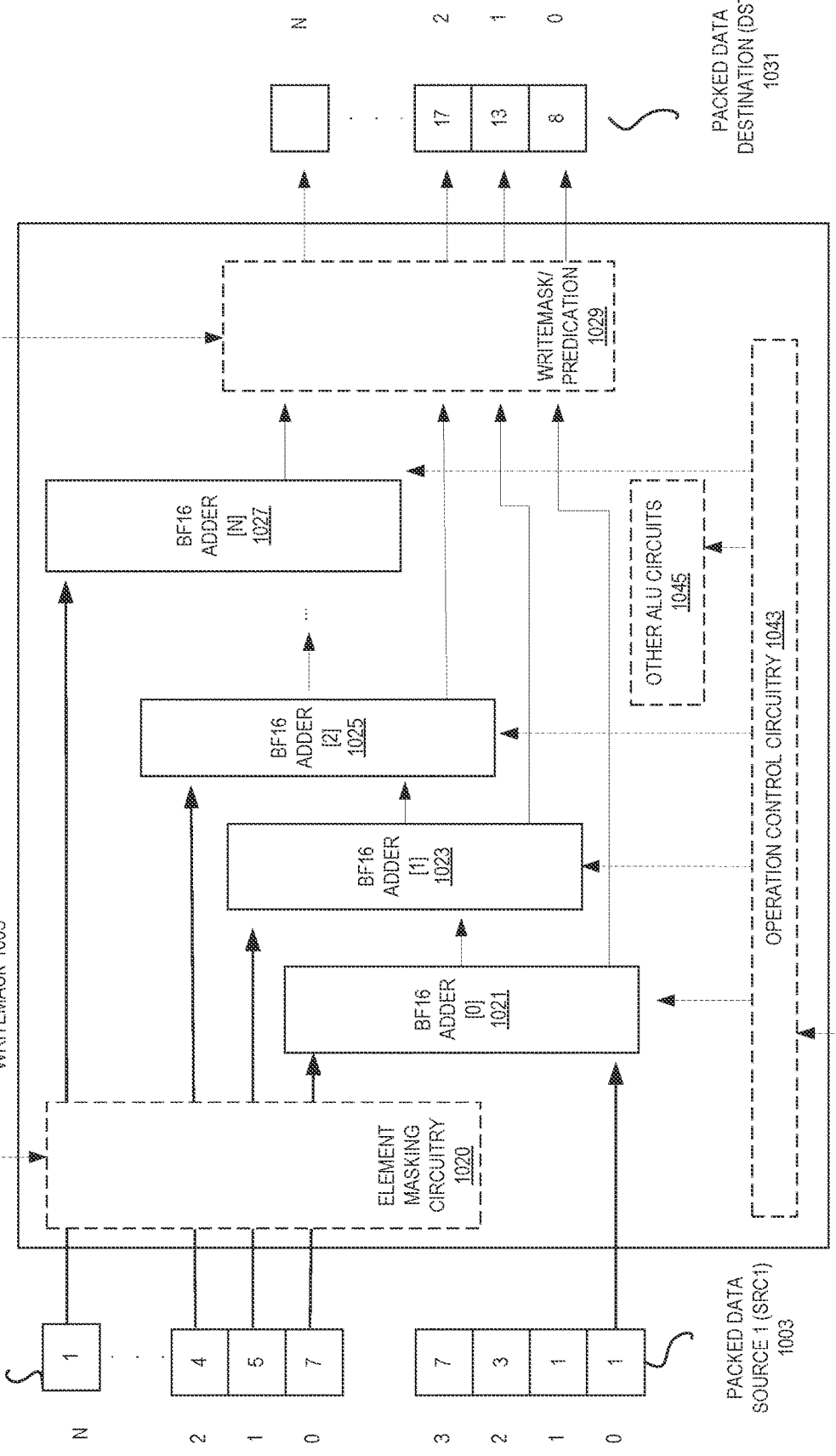
FIG. 10 illustrates exemplary executions of a BF16 prefix sum instruction.

FIG. 10 illustrates exemplary executions of a BF16 prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on which in this case is BF16 (FP64) shown as PS.

An example of a format for a BF16 prefix sum instruction is VPSCANADDBF16 DST, SRC1, SRC2. In some examples, VPSCANADD is the base opcode mnemonic of the instruction which may be supplemented as detailed above adding BF16 for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a BF16 prefix sum instruction is VPSCANADDBF16 {k} DST, SRC1, SRC2. In some examples, VPSCANADD is the base opcode mnemonic of the instruction which may be supplemented as detailed above adding BF16 for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by 16-18 (or "aaa") of payload byte 2 3015 of prefix 2501(C).

In this illustration, a first packed data source (SRC1) 1003 and a second packed data source (SRC2) 1001 are provided (note that first and second source may not align with the preceding description—that is they may be flipped). As shown, execution circuitry 1009 includes at least one BF16 adder circuit such as 1021-1027. While illustration shows N BF16 adders, in some examples, the same adder is re-used multiple times and this illustrates a logical implementation. In some examples, the execution circuitry 1009 is a part of a pipeline execution (such an execute stage 2216). In some examples, the execution circuitry 1009 is a part of, or comprises, execution unit(s) circuitry 2262 and/or execution circuitry 1209. The execution circuitry 1009 comprises combinational logic circuitry in some examples.

In this illustration, a data element from a least significant data element position of SRC1 1003 is provided to BF16 adder[0] 1021. In some examples, BF16 adder[0] 1021 also receives a data element from a least significant data element position of SRC2 1001 and adds those two data elements together to generate an addition result. In some examples, the result is stored in data element position [0] of DST 1031.

The result of that addition is fed into BF16 adder[1] 1023 which, in some examples, receives a data element from a data element position [1] of SRC2 1001 and adds the result from BF16 adder[0] 1021 to the data element of data element position [1] of SRC2 1001 to be stored in data element position [1] of DST 1031, etc.

In some examples, the writemask 1005 of the writemask register identified by the instruction is used by writemask/predication circuitry 1029 to selectively write the output of each adder into the DST 1031. For example, the writemask 1005 may comprises a plurality of bits wherein values in corresponding bit positions are used to determine what gets written. In some examples, a 0 for a value in a bit position of the writemask 1005 indicates to write a zero. In some examples, a 0 for a value in a bit position of the writemask 1005 indicates to leave an existing value in the destination 1031. In some examples, the writemask 1005 is not a bit mask and which bit positions are used for masking (or predicating) are dependent upon the size of the writemask/predication register and data elements to be writemasked/predicated.

In some examples, the writemask 1005 of the writemask register identified by the instruction is used to selectively mask out inputs into each adder using element masking circuitry 1021. For example, the writemask 1005 may comprise a plurality of bits wherein values in corresponding bit positions are used to determine what data element positions of the second source 1001 are to be provided to the adders. In some examples, a 0 for a value in a bit position of the writemask 1005 indicates to not provide a data element in a corresponding data element position of the second source 1001. For example, when the writemask[0] is 0, in some instances the data element of SRC2[0] is not fed to adder 1021.

As noted above, the datatype and size may vary depending on the opcode, etc. In some examples, a decoder and/or scheduler provides this information (as control 1041) to the execution circuitry 1009 that allows for the proper execution unit type (e.g., BF16 adder) to be used. In some examples, operation control circuitry 1043 configures the execution circuitry 1009 according to that control information 1041 to use one or more BF16 adders instead of other ALU circuits 1045 such as Boolean logic circuits, etc. In some examples, the operation control circuitry 1043 is external to the execution circuitry 1009 such as a part of a scheduler such as scheduler 2256.

Figure 11:
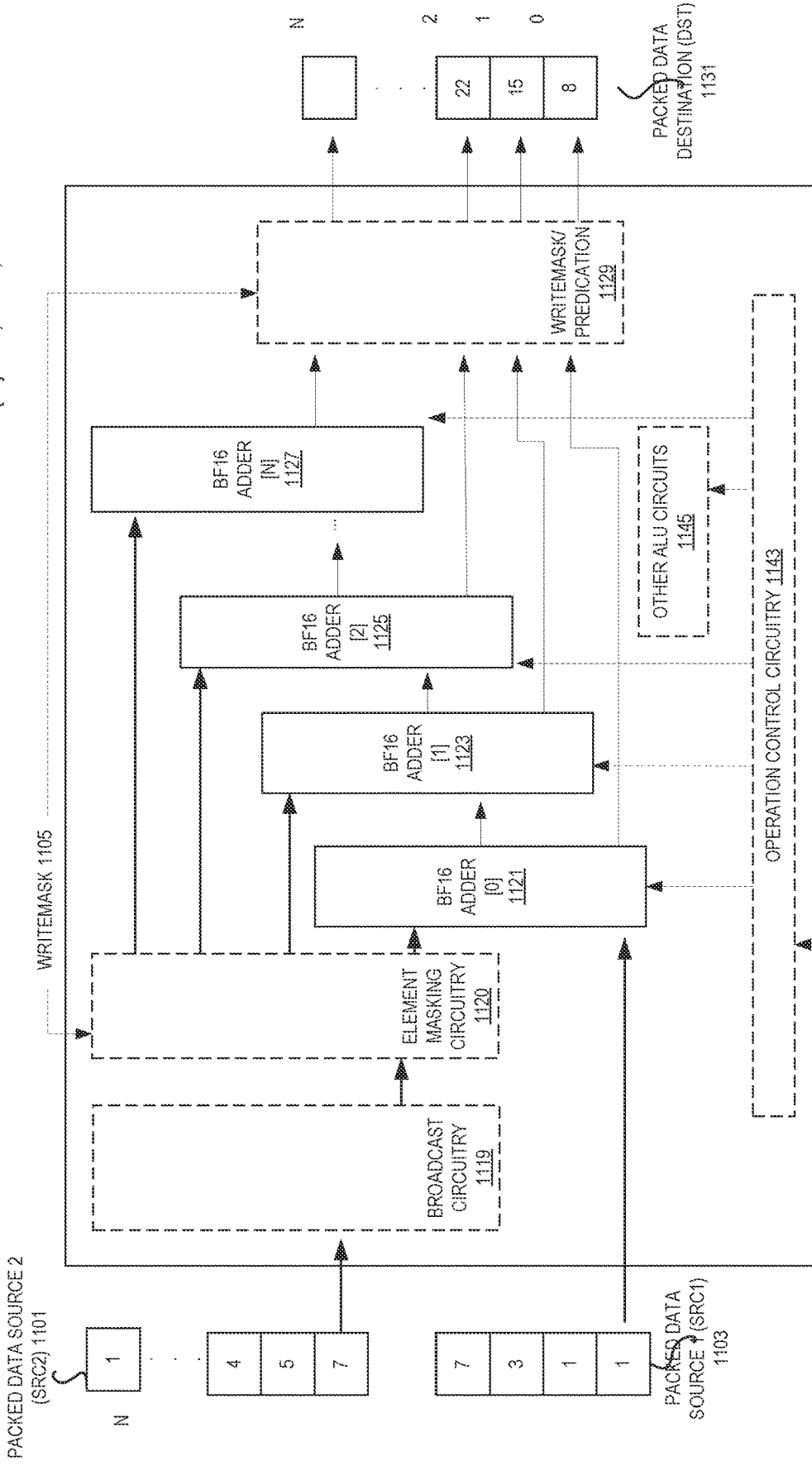
FIG. 11 illustrates exemplary executions of a BF16 prefix sum instruction.

FIG. 11 illustrates exemplary executions of a BF16 prefix sum instruction. While this illustration is in little endian format, the principles discussed herein work in big endian format. In this particular illustration, the base instruction opcode mnemonic is VPSCANADD. The opcode indicates the operation to be performed (in this case a scan add or prefix sum). In some examples, the opcode also indicates, or at least partially indicates, a datatype and size of elements to be operated on.

An example of a format for a BF16 prefix sum instruction is VPSCANADDBF16 DST, SRC1, SRC2. In some examples, VPSCANADD is the base opcode mnemonic of the instruction which may be supplemented as detailed above adding BF16 for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30.

An example of a format for a BF16 prefix sum instruction is VPSCANADDBF16 {k} DST, SRC1, SRC2. In some examples, VPSCANADD is the base opcode mnemonic of the instruction which may be supplemented as detailed above adding BF16 for the data element type and size. The opcode 2503 itself, and potentially aspects of a prefix 2501, provides an indication that prefix sum is to be performed. DST is at least one field to identify a destination operand such as packed data register or memory location. In some examples, the destination operand is identified via at least REG 2644. SRC1 and SRC2 are fields that identify for the source operands, such as packed data registers and/or memory. In some examples, the first source identifier is provided by VVVV from 3017, 2905, or 2917. In some examples, the second source identifier is provided by at least R\M 2646. Note that additional information from the SIB Byte 2604 may also be e used. Additionally, the R bit or RXB bits from a prefix is used in some examples for identifying a one of the destination, first source, and/or second source. In some examples, the instruction uses a VEX prefix. In some examples, the VEX prefix is illustrated in FIGS. 29(A)-(B). In some examples, the instruction uses a EVEX prefix. In some examples, the EVEX prefix is illustrated in FIG. 30. Additionally, a writemask k register (to store a mask) is identified provided by 16-18 (or "aaa") of payload byte 2 3015 of prefix 2501(C).

In this illustration, a first packed data source (SRC1) 1103 and a second packed data source (SRC2) 1101 are provided (note that first and second source may not align with the preceding description—that is they may be flipped). As shown, execution circuitry 1109 includes at least one BF16 adder circuit such as 1121-1127. While illustration shows N BF16 adders, in some examples, the same adder is re-used multiple times and this illustrates a logical implementation. In some examples, the execution circuitry 1109 is a part of a pipeline execution (such an execute stage 2216). In some examples, the execution circuitry 1109 is a part of, or comprises, execution unit(s) circuitry 2262 and/or execution circuitry 1209. The execution circuitry 1109 comprises combinational logic circuitry in some examples.

In this illustration, a data element from a least significant data element position of SRC1 1103 is provided to BF16 adder[0] 1121. In some examples, BF16 adder[0] 1121 also receives a data element from a least significant data element position of SRC2 1101 and adds those two data elements together to generate an addition result. In some examples, the result is stored in data element position [0] of DST 1131.

The result of that addition is fed into BF16 adder[1] 1123 which, in some examples, receives a data element from a data element position [1] of SRC2 1101 and adds the result from BF16 adder[0] 1121 to the data element of data element position [1] of SRC2 1101 to be stored in data element position [1] of DST 1131, etc.

In some examples, the writemask 1105 of the writemask register identified by the instruction is used by writemask/predication circuitry 1129 to selectively write the output of each adder into the DST 1131. For example, the writemask 1105 may comprises a plurality of bits wherein values in corresponding bit positions are used to determine what gets written. In some examples, a 0 for a value in a bit position of the writemask 1105 indicates to write a zero. In some examples, a 0 for a value in a bit position of the writemask 1105 indicates to leave an existing value in the destination 1131. In some examples, the writemask 1105 is not a bit mask and which bit positions are used for masking (or predicating) are dependent upon the size of the writemask/predication register and data elements to be writemasked/predicated.

In some examples, broadcast circuitry 1119 is used to broadcast a particular data element of the second source 1101 under conditions (e.g., an indication to use broadcasting is present in a prefix of the instruction and the second source 1101 is memory).

In some examples, the writemask 1105 of the writemask register identified by the instruction is used to selectively mask out inputs into each adder using element masking circuitry 1121. For example, the writemask 1105 may comprise a plurality of bits wherein values in corresponding bit positions are used to determine what data element positions of the second source 1101 are to be provided to the adders. In some examples, a 0 for a value in a bit position of the writemask 1105 indicates to not provide a data element in a corresponding data element position of the second source 1101. For example, when the writemask[0] is 0, in some instances the data element of SRC2[0] is not fed to adder 1121.

As noted above, the datatype and size may vary depending on the opcode, etc. In some examples, a decoder and/or scheduler provides this information (as control 1141) to the execution circuitry 1109 that allows for the proper execution unit type (e.g., BF16 adder) to be used. In some examples, operation control circuitry 1143 configures the execution circuitry 1109 according to that control information 1141 to use one or more BF16 adders instead of other ALU circuits 1145 such as Boolean logic circuits, etc. In some examples, the operation control circuitry 1143 is external to the execution circuitry 1109 such as a part of a scheduler such as scheduler 2256.

Figure 12:
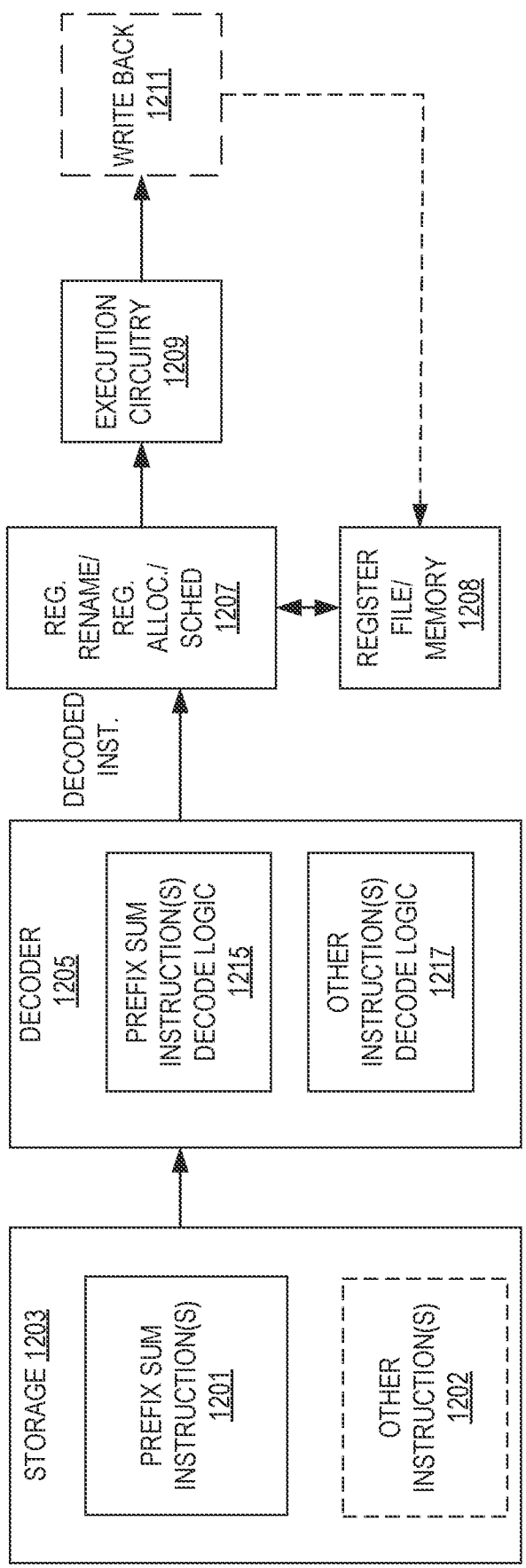
FIG. 12 illustrates examples of hardware to process a prefix sum instruction.

FIG. 12 illustrates examples of hardware to process a prefix sum instruction. The instruction may be one or more of the instructions detailed above. As illustrated, storage 1203 stores one or more prefix sum instructions 1201 to be executed. The storage 1203 may also store other, non-prefix sum instructions 1202 to be executed.

The instruction 1201 is received by decoder circuitry 1205. For example, the decoder circuitry 1205 receives this instruction from fetch circuitry (not shown). Examples of decoder circuitry are detailed later. The instruction may be in any suitable format, such as that describe with reference to figures detailed below. Prefix sum instruction decode logic 1215 decodes prefix sum instructions. Other instruction decode logic 1217 other, non-prefix sum instructions.

More detailed examples of at least one instruction format for the instruction will be detailed later. The decoder circuitry 1205 decodes the instruction into one or more operations. In some examples, this decoding includes generating a plurality of micro-operations to be performed by execution circuitry (such as execution circuitry 1209). The decoder circuitry 1205 also decodes instruction prefixes.

In some examples, register renaming, register allocation, and/or scheduling circuitry 1207 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) and/or memory 1208 store data as operands of the instruction to be operated on by execution circuitry 1209. Exemplary register types include packed data registers, general purpose registers (GPRs), and floating-point registers.

Execution circuitry 1209 executes the decoded instruction (prefix sum or otherwise). Exemplary detailed execution circuitry includes execution circuitry 109 shown in FIG. 1, 2, etc., and execution cluster(s) 2260 shown in FIG. 22(B), etc. The execution of the decoded instruction causes the execution circuitry to perform a prefix sum as detailed above and below.

Example pseudocode for the execution of integer prefix sums are as follows:

```
VPSCANADDB dest {k1}, src1, src2
VL = 128, 256 or 512
KL := VL / 8
tmp := scr1.byte[0]
for i := 0 to KL-1:
    if k1[i] or *no writemask*:
        if src is memory and (EVEX.b == 1):
            tsrc := src2.byte[0]
        else:
            tsrc := src2.byte[i]
        tmp := tmp + tsrc // unsigned add
        dest .byte[i] := tmp
    else if *zeroing*:
        dest .byte[i] := 0
    // else dest .byte[i] remains unchanged
dest [MAX_VL-1 :VL] := 0
UNSIGNED BYTE
VPSCANADDW dest {k1}, src1, src2
VL = 128, 256 or 512
KL := VL / 16
tmp := scr1.word[0]
for i := 0 to KL-1:
    if k1[i] or *no writemask*:
        if src is memory and (EVEX.b == 1):
            tsrc := src2.word[0]
        else:
            tsrc := src2.word[i]
        tmp := tmp + tsrc // unsigned add
        dest .word[i] := tmp
    else if *zeroing*:
        dest .word[i] := 0
    // else dest .word[i] remains unchanged
dest [MAX_VL-1 :VL] := 0
UNSIGNED WORD
VPSCANADDW dest {k1}, src1, src2
VL = 128, 256 or 512
KL := VL / 16
tmp := scr1.word[0]
for i := 0 to KL-1:
    if k1[i] or *no writemask*:
        if src is memory and (EVEX.b == 1):
            tsrc := src2.word[0]
        else:
            tsrc := src2.word[i]
        tmp := tmp + tsrc // unsigned add
        dest .word[i] := tmp
    else if *zeroing*:
        dest .word[i] := 0
    // else dest .word[i] remains unchanged
dest [MAX_VL-1 :VL] := 0
UNSIGNED DOUBLE WORD
VPSCANADDQ dest {k1}, src1, src2
VL = 128, 256 or 512
KL := VL / 64
tmp := scr1.qword[0]
for i := 0 to KL-1:
    if k1[i] or *no writemask*:
        if src is memory and (EVEX.b == 1):
            tsrc := src2.qword[0]
        else:
            tsrc := src2.qword[i]
        tmp := tmp + tsrc // unsigned add
        dest .qword[i] := tmp
    else if *zeroing*:
        dest .qword[i] := 0
    // else dest .qword[i] remains unchanged
dest [MAX_VL-1 :VL] := 0
UNSIGNED QUADWORD
VPSCANADDSB dest {k1}, src1, src2
VL = 128, 256 or 512
KL := VL / 8
tmp := scr1.byte[0]
for i := 0 to KL-1:
    if k1[i] or *no writemask*:
        if src is memory and (EVEX.b == 1):
            tsrc := src2.byte[0]
        else:
            tsrc := src2.byte[i]
        tmp := tmp + tsrc // signed add
        dest .byte[i] := tmp
    else if *zeroing*:
        dest .byte[i] := 0
    // else dest .byte[i] remains unchanged
dest [MAX_VL-1 :VL] := 0
SIGNED BYTE
VPSCANADDSW dest {k1}, src1, src2
VL = 128, 256 or 512
KL := VL / 16
tmp := scr1.word[0]
for i := 0 to KL-1:
    if k1[i] or *no writemask*:
        if src is memory and (EVEX.b == 1):
            tsrc := src2.word[0]
        else:
            tsrc := src2.word[i]
        tmp := tmp + tsrc // signed add
        dest .word[i] := tmp
    else if *zeroing*:
        dest .word[i] := 0
    // else dest .word[i] remains unchanged
dest [MAX_VL-1 :VL] := 0
SIGNED WORD
VPSCANADDSD dest {k1}, src1, src2
VL = 128, 256 or 512
KL := VL / 32
tmp := scr1.dword[0]
for i := 0 to KL-1:
    if k1[i] or *no writemask*:
        if src is memory and (EVEX.b == 1):
            tsrc := src2.dword[0]
        else:
            tsrc := src2.dword[i]
        tmp := tmp + tsrc // signed add
        dest .word[i] := tmp
    else if *zeroing*:
        dest .dword[i] := 0
    // else dest .dword[i] remains unchanged
dest [MAX_VL-1 :VL] := 0
SIGNED DOUBLE WORD
VPSCANADDSQ dest {k1}, src1, src2
VL = 128, 256 or 512
KL := VL / 64
tmp := scr1.qword[0]
for i := 0 to KL-1:
    if k1[i] or *no writemask*:
        if src is memory and (EVEX.b == 1):
            tsrc := src2.qword[0]
        else:
            tsrc := src2.qword[i]
        tmp := tmp + tsrc // signed add
        dest .qword[i] := tmp
    else if *zeroing*:
        dest .qword[i] := 0
    // else dest .qword[i] remains unchanged
dest [MAX_VL-1 :VL] := 0
SIGNED QUADWORD
```

Example pseudocode for the execution of floating point prefix sums are as follows:

```
VPSCANADDPS dest {k1}, src1, src2
VL = 128, 256 or 512
KL := VL / 32
tmp := scr1.fp32[0]
for i := 0 to KL-1:
    if k1[i] or *no writemask*:
        if src is memory and (EVEX.b == 1):
            tsrc := src2. fp32[0]
        else:
            tsrc := src2. fp32[i]
        tmp := tmp + tsrc
        dest . fp32[i] := tmp
    else if *zeroing*:
        dest . fp32[i] := 0
    // else dest . fp32[i] remains unchanged
dest [MAX_VL-1 :VL] := 0
DOUBLE PRECISION
VPSCANADDPS dest {k1}, src1, src2
VL = 128, 256 or 512
KL := VL / 32
tmp := scr1.fp32[0]
for i := 0 to KL-1:
    if k1[i] or *no writemask*:
        if src is memory and (EVEX.b == 1):
            tsrc := src2. fp32[0]
        else:
            tsrc := src2. fp32[i]
        tmp := tmp + tsrc
        dest . fp32[i] := tmp
    else if *zeroing*:
        dest . fp32[i] := 0
    // else dest . fp32[i] remains unchanged
dest [MAX_VL-1 :VL] := 0
SINGLE PRECISION
VPSCANADDPH dest {k1}, src1, src2
VL = 128, 256 or 512
KL := VL / 16
tmp := scr1.fp16[0]
for i := 0 to KL-1:
    if k1[i] or *no writemask*:
        if src is memory and (EVEX.b == 1):
            tsrc := src2. fp16[0]
        else:
            tsrc := src2. fp16[i]
        tmp := tmp + tsrc
        dest . fp16[i] := tmp
    else if *zeroing*:
        dest . fp16[i] := 0
    // else dest . fp16[i] remains unchanged
dest [MAX_VL-1 :VL] := 0
HALF PRECISION
VPSCANADDNEPBF16 dest {k1}, src1, src2
VL = 128, 256 or 512
KL := VL / 16
tmp := scr1.bf16[0]
for i := 0 to KL-1:
    if k1[i] or *no writemask*:
        if src is memory and (EVEX.b == 1):
            tsrc := src2. bf16[0]
        else:
            tsrc := src2. bf16[i]
            tmp := tmp + tsrc // DAZ. FTZ, RNE. SAE
            dest . bf16[i] := tmp
    else if *zeroing*:
        dest . bf16[i] := 0
    // else dest . bf16[i] remains unchanged
dest [MAX_VL-1 :VL] := 0
BF16
```

In some examples, retirement/write back circuitry 1211 architecturally commits the destination register into the registers or memory 1208 and retires the instruction.

FIG. 13 illustrates an example of method performed by a processor to process a prefix sum instruction. For example, a processor core as shown in FIG. 22(B), a pipeline as detailed below, etc., performs this method.

At 1301, an instance of a single prefix sum instruction (such as those detailed above) is fetched. In some examples, the instance of the single instruction at least has fields for an opcode, one or fields to reference a first source operand, one or fields to reference a second source operand, one or fields to reference a destination operand, one or more fields to reference a mask operand, wherein the opcode is to indicate that execution circuitry is, in response to a decoded instance of the single instruction, to at least: perform a prefix sum by for each non-masked data element position of the second source operand (as indicated by the mask operand) adding a data element of that data element position to each data element of preceding data element positions and adding at least one data element of a defined data element position of the first source operand, and store each prefix sum for each data element position of the second source operand into a corresponding data element position of the destination operand (in some examples subject to a writemask). In some examples, the instruction further includes a field for a writemask. In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)).

The fetched instruction is decoded at 1303. For example, the fetched prefix sum instruction is decoded by decoder circuitry such as decoder circuitry 1205 or decode circuitry 2240 detailed herein.

Data values associated with the source operands of the decoded instruction are retrieved when the decoded instruction is scheduled at 1305. For example, when one or more of the source operands are memory operands, the data from the indicated memory location is retrieved.

At 1307, the decoded instruction is executed by execution circuitry (hardware) such as execution circuitry 109 shown in FIG. 1, execution circuitry 1209 shown in FIG. 12, or execution cluster(s) 2260 shown in FIG. 22(B) according to the opcode. For the prefix sum instruction, the execution will cause execution circuitry to perform the operations described in connection with earlier illustrated figures, etc.

In some examples, the instruction is committed or retired at 1309.

FIG. 14 illustrates an example of method to process a prefix sum instruction using emulation or binary translation. For example, a processor core as shown in FIG. 22(B), a pipeline and/or emulation/translation layer perform aspects of this method.

Figure 31:
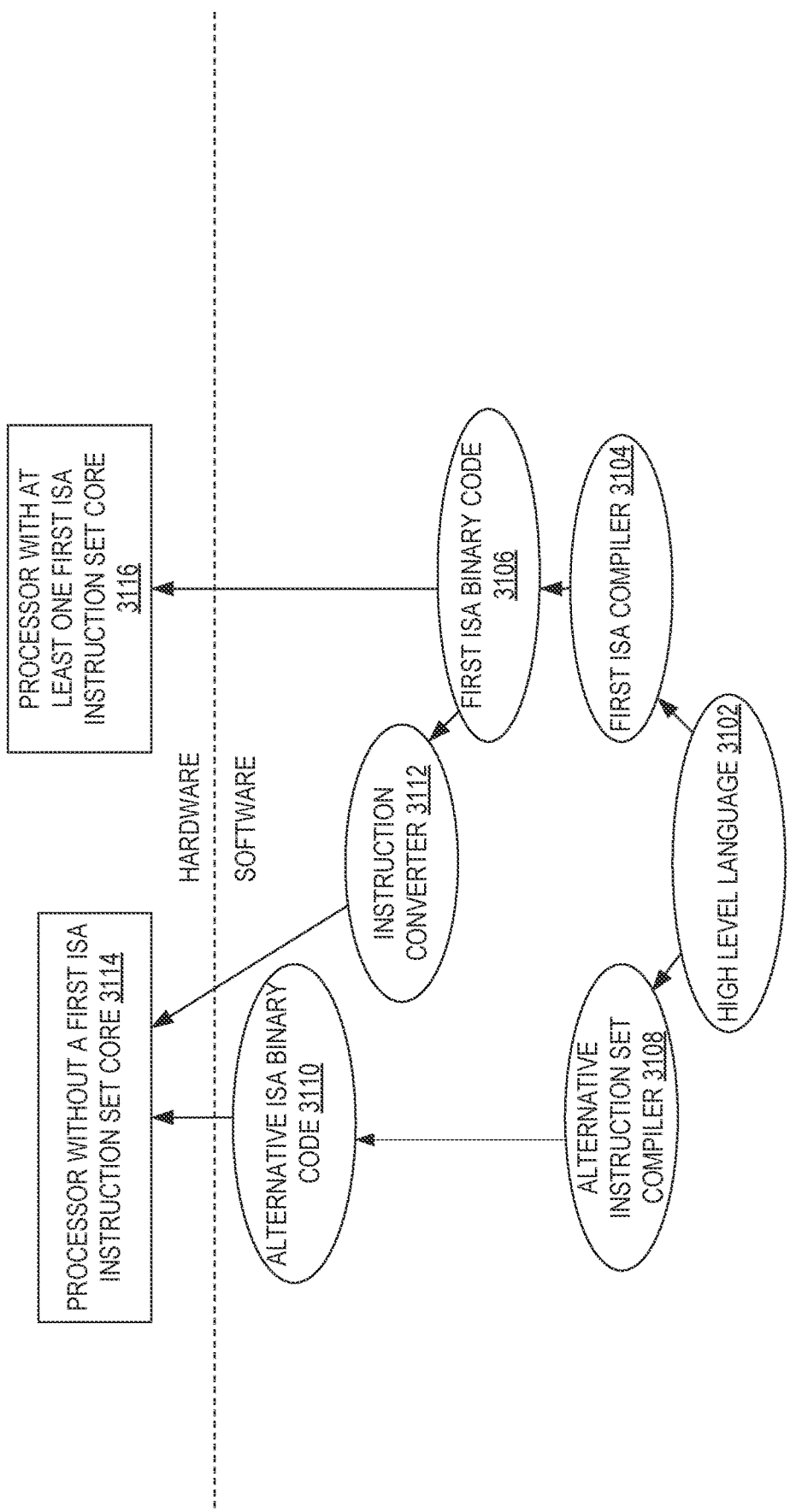
FIG. 31 is a block diagram illustrating the use of a software instruction converter to convert binary instructions in a source instruction set architecture to binary instructions in a target instruction set architecture according to examples.

An instance of a single prefix sum instruction of a first instruction set architecture is translated into one or more instructions of a second instruction set architecture at 1401. In some examples, the single prefix sum instruction at least has fields for an opcode, one or fields to reference a first source operand, one or fields to reference a second source operand, one or fields to reference a destination operand, wherein the opcode is to indicate that execution circuitry is, in response to a decoded instance of the single instruction, to at least: perform a prefix sum by for each position of the second source operand adding a data element of that data element position to each data element of preceding data element positions and adding at least one data element of a defined data element position of the first source operand, and store each prefix sum for each data element position of the second source operand into a corresponding data element position of the destination operand. In some examples, the instruction further includes a field for a writemask. In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)). This translation is performed by a translation and/or emulation layer of software in some examples. In some examples, this translation is performed by an instruction converter 3112 as shown in FIG. 31. In some examples, the translation is performed by hardware translation circuitry.

The one or more translated instructions of the second instruction set architecture are decoded at 1403. For example, the translated instructions are decoded by decoder circuitry such as decoder circuitry 1205 or decode circuitry 2240 detailed herein. In some examples, the operations of translation and decoding at 1402 and 1403 are merged.

Data values associated with the source operand(s) of the decoded one or more instructions of the second instruction set architecture are retrieved and the one or more instructions are scheduled at 1405. For example, when one or more of the source operands are memory operands, the data from the indicated memory location is retrieved.

At 1407, the decoded instruction(s) of the second instruction set architecture is/are executed by execution circuitry (hardware) such as execution circuitry 109 shown in FIG. 1, execution circuitry 1209 shown in FIG. 12, or execution cluster(s) 2260 shown in FIG. 22(B), to perform the prefix sum operation(s) indicated by the opcode of the single instruction of the first instruction set architecture. For the prefix sum instruction, the execution will cause execution circuitry to perform the operations described in connection with earlier illustrated figures, etc.

In some examples, the instruction is committed or retired at 1409.

FIG. 15 illustrates an example of method performed by a processor to process a prefix sum instruction. For example, a processor core as shown in FIG. 22(B), a pipeline as detailed below, etc., performs this method.

At 1501, an instance of a single prefix sum instruction (such as those detailed above) is fetched. In some examples, the instance of the single instruction at least has fields for an opcode, one or fields to reference a first source operand, one or fields to reference a second source operand, one or fields to reference a destination operand, wherein the opcode is to indicate that execution circuitry is, in response to a decoded instance of the single instruction, to at least: perform a prefix sum by for each data element position of the second source operand adding a data element of that data element position to each data element of preceding data element positions and adding at least one data element of a defined data element position of the first source operand, and store each prefix sum for each data element position of the second source operand into a corresponding data element position of the destination operand. In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)).

The fetched instruction is decoded at 1503. For example, the fetched prefix sum instruction is decoded by decoder circuitry such as decoder circuitry 1205 or decode circuitry 2240 detailed herein.

Data values associated with the source operands of the decoded instruction are retrieved when the decoded instruction is scheduled at 1505. For example, when one or more of the source operands are memory operands, the data from the indicated memory location is retrieved.

At 1507, the decoded instruction is executed by execution circuitry (hardware) such as execution circuitry 109 shown in FIG. 1, execution circuitry 1209 shown in FIG. 12, or execution cluster(s) 2260 shown in FIG. 22(B) according to the opcode. For the prefix sum instruction, the execution will cause execution circuitry to perform the operations described in connection with earlier illustrated figures, etc.

In some examples, the instruction is committed or retired at 1509.

FIG. 16 illustrates an example of method performed by a processor to process a prefix sum instruction. For example, a processor core as shown in FIG. 22(B), a pipeline as detailed below, etc., performs this method.

At 1601, an instance of a single prefix sum instruction (such as those detailed above) is fetched. In some examples, the instance of the single instruction at least has fields for an opcode, one or fields to reference a first source operand, one or fields to reference a second source operand, one or fields to reference a destination operand, one or more fields to reference a mask operand, wherein the opcode is to indicate that execution circuitry is, in response to a decoded instance of the single instruction, to at least: perform a prefix sum by for each non-masked data element position of the second source operand (as indicated by the mask operand) adding a data element of that data element position to each data element of preceding data element positions and adding at least one data element of a defined data element position of the first source operand, and store each prefix sum for each data element position of the second source operand into a corresponding data element position of the destination operand (in some examples subject to a writemask). In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)).

The fetched instruction is decoded at 1603. For example, the fetched prefix sum instruction is decoded by decoder circuitry such as decoder circuitry 1205 or decode circuitry 2240 detailed herein.

Data values associated with the source operands of the decoded instruction are retrieved when the decoded instruction is scheduled at 1605. For example, when one or more of the source operands are memory operands, the data from the indicated memory location is retrieved.

At 1607, the decoded instruction is executed by execution circuitry (hardware) such as execution circuitry 109 shown in FIG. 1, execution circuitry 1209 shown in FIG. 12, or execution cluster(s) 2260 shown in FIG. 22(B) according to the opcode. For the prefix sum instruction, the execution will cause execution circuitry to perform the operations described in connection with earlier illustrated figures, etc.

In some examples, the instruction is committed or retired at 1609.

Figure 17:
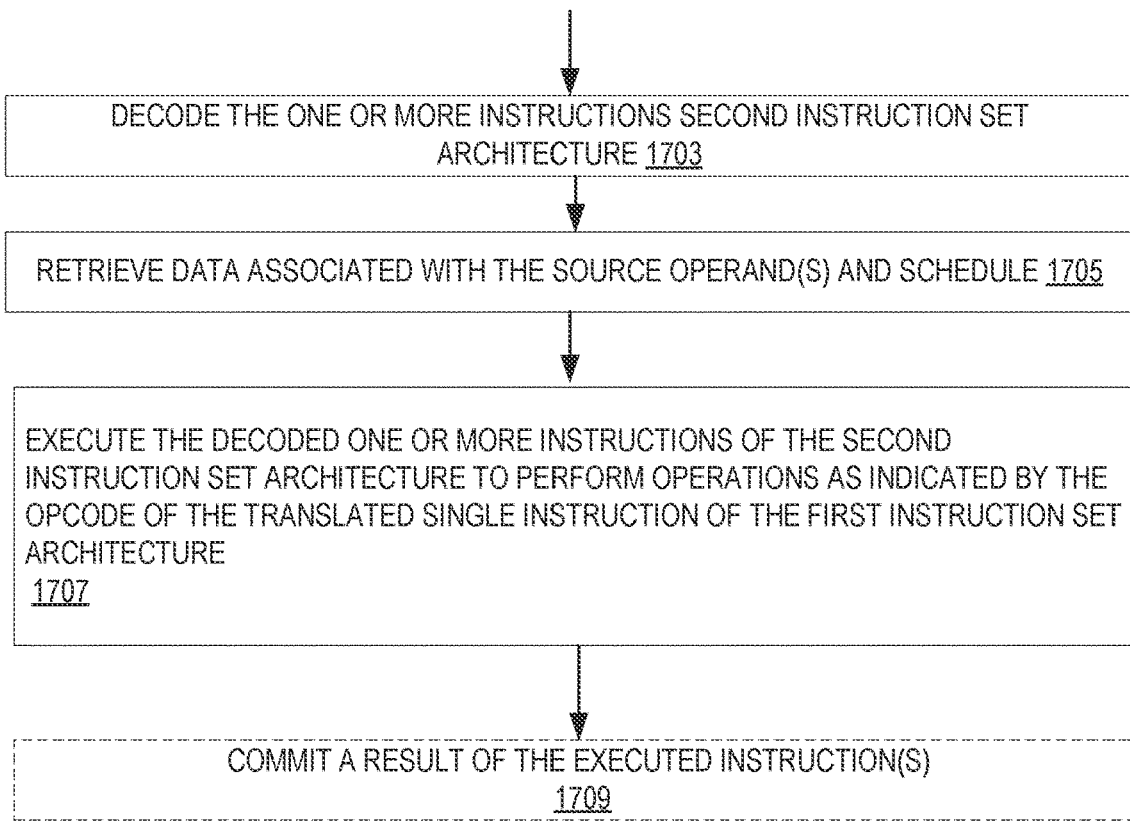
FIG. 17 illustrates an example of method to process a prefix sum instruction using emulation or binary translation.

FIG. 17 illustrates an example of method to process a prefix sum instruction using emulation or binary translation. For example, a processor core as shown in FIG. 22(B), a pipeline and/or emulation/translation layer perform aspects of this method.

An instance of a single prefix sum instruction of a first instruction set architecture is translated into one or more instructions of a second instruction set architecture at 1701. In some examples, the single prefix sum instruction at least has fields for an opcode, one or fields to reference a first source operand, one or fields to reference a second source operand, one or fields to reference a destination operand, one or more fields to reference a mask operand, wherein the opcode is to indicate that execution circuitry is, in response to a decoded instance of the single instruction, to at least: perform a prefix sum by for each non-masked data element position of the second source operand (as indicated by the mask operand) adding a data element of that data element position to each data element of preceding data element positions and adding at least one data element of a defined data element position of the first source operand, and store each prefix sum for each data element position of the second source operand into a corresponding data element position of the destination operand (in some examples subject to a writemask). In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)). This translation is performed by a translation and/or emulation layer of software in some examples. In some examples, this translation is performed by an instruction converter 3112 as shown in FIG. 31. In some examples, the translation is performed by hardware translation circuitry.

The one or more translated instructions of the second instruction set architecture are decoded at 1703. For example, the translated instructions are decoded by decoder circuitry such as decoder circuitry 1205 or decode circuitry 2240 detailed herein. In some examples, the operations of translation and decoding at 1702 and 1703 are merged.

Data values associated with the source operand(s) of the decoded one or more instructions of the second instruction set architecture are retrieved and the one or more instructions are scheduled at 1705. For example, when one or more of the source operands are memory operands, the data from the indicated memory location is retrieved.

At 1707, the decoded instruction(s) of the second instruction set architecture is/are executed by execution circuitry (hardware) such as execution circuitry 109 shown in FIG. 1, execution circuitry 1209 shown in FIG. 12, or execution cluster(s) 2260 shown in FIG. 22(B), to perform the prefix sum operation(s) indicated by the opcode of the single instruction of the first instruction set architecture. For the prefix sum instruction, the execution will cause execution circuitry to perform the operations described in connection with earlier illustrated figures, etc.

In some examples, the instruction is committed or retired at 1709.

FIG. 18 illustrates an example of method performed by a processor to process a prefix sum instruction. For example, a processor core as shown in FIG. 22(B), a pipeline as detailed below, etc., performs this method.

At 1801, an instance of a single prefix sum instruction (such as those detailed above) is fetched. In some examples, the instance of the single instruction at least has fields for an opcode, one or fields to reference a first source operand, one or fields to reference a second source operand, one or fields to reference a destination operand, one or more fields to reference a mask operand, wherein the opcode is to indicate that execution circuitry is, in response to a decoded instance of the single instruction, to at least: perform a prefix sum by for each non-masked data element position of the destination operand as indicated by the mask operand adding a broadcasted data element of second source operand to at least one data element of a defined data element position of the first source operand and to each preceding broadcasted data element as indicated by the mask operand, and store each prefix sum into the destination operand (in some examples subject to the mask operand). In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)).

The fetched instruction is decoded at 1803. For example, the fetched prefix sum instruction is decoded by decoder circuitry such as decoder circuitry 1205 or decode circuitry 2240 detailed herein.

Data values associated with the source operands of the decoded instruction are retrieved when the decoded instruction is scheduled at 1805. For example, when one or more of the source operands are memory operands, the data from the indicated memory location is retrieved.

At 1807, the decoded instruction is executed by execution circuitry (hardware) such as execution circuitry 109 shown in FIG. 1, execution circuitry 1209 shown in FIG. 12, or execution cluster(s) 2260 shown in FIG. 22(B) according to the opcode. For the prefix sum instruction, the execution will cause execution circuitry to perform the operations described in connection with earlier illustrated figures, etc.

In some examples, the instruction is committed or retired at 1809.

Figure 19:
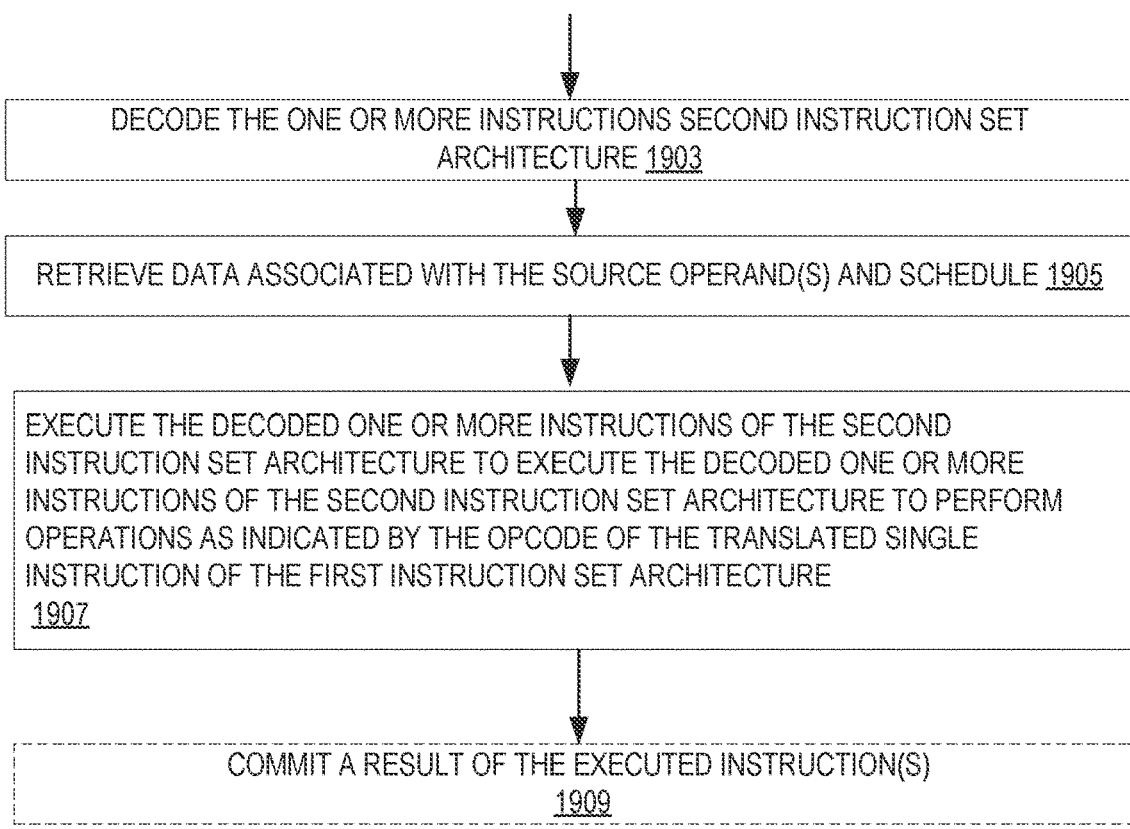
FIG. 19 illustrates an example of method to process a prefix sum instruction using emulation or binary translation.

FIG. 19 illustrates an example of method to process a prefix sum instruction using emulation or binary translation. For example, a processor core as shown in FIG. 22(B), a pipeline and/or emulation/translation layer perform aspects of this method.

An instance of a single prefix sum instruction of a first instruction set architecture is translated into one or more instructions of a second instruction set architecture at 1901. In some examples, the single prefix sum instruction at least has fields for an opcode, one or fields to reference a first source operand, one or fields to reference a second source operand, one or fields to reference a destination operand, one or more fields to reference a mask operand, wherein the opcode is to indicate that execution circuitry is, in response to a decoded instance of the single instruction, to at least: perform a prefix sum by for each non-masked data element position of the destination operand as indicated by the mask operand adding a broadcasted data element of second source operand to at least one data element of a defined data element position of the first source operand and to each preceding broadcasted data element as indicated by the mask operand, and store each prefix sum into the destination operand (in some examples subject to the mask operand). In some examples, the instruction is fetched from an instruction cache. The opcode and/or opcode and prefix define the datatype and size of the source operands. In some examples, the execution circuitry is configured to perform the prefix sum using the defined datatype and size (e.g., by selecting the proper adder(s)). This translation is performed by a translation and/or emulation layer of software in some examples. In some examples, this translation is performed by an instruction converter 3112 as shown in FIG. 31. In some examples, the translation is performed by hardware translation circuitry.

The one or more translated instructions of the second instruction set architecture are decoded at 1903. For example, the translated instructions are decoded by decoder circuitry such as decoder circuitry 1205 or decode circuitry 2240 detailed herein. In some examples, the operations of translation and decoding at 1902 and 1903 are merged.

Data values associated with the source operand(s) of the decoded one or more instructions of the second instruction set architecture are retrieved and the one or more instructions are scheduled at 1905. For example, when one or more of the source operands are memory operands, the data from the indicated memory location is retrieved.

At 1907, the decoded instruction(s) of the second instruction set architecture is/are executed by execution circuitry (hardware) such as execution circuitry 109 shown in FIG. 1, execution circuitry 1209 shown in FIG. 12, or execution cluster(s) 2260 shown in FIG. 22(B), to perform the prefix sum operation(s) indicated by the opcode of the single instruction of the first instruction set architecture. For the prefix sum instruction, the execution will cause execution circuitry to perform the operations described in connection with earlier illustrated figures, etc.

In some examples, the instruction is committed or retired at 1909.

Detailed below are example cores, architectures, etc. in which examples detailed above may be embodied.

Example Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 20:
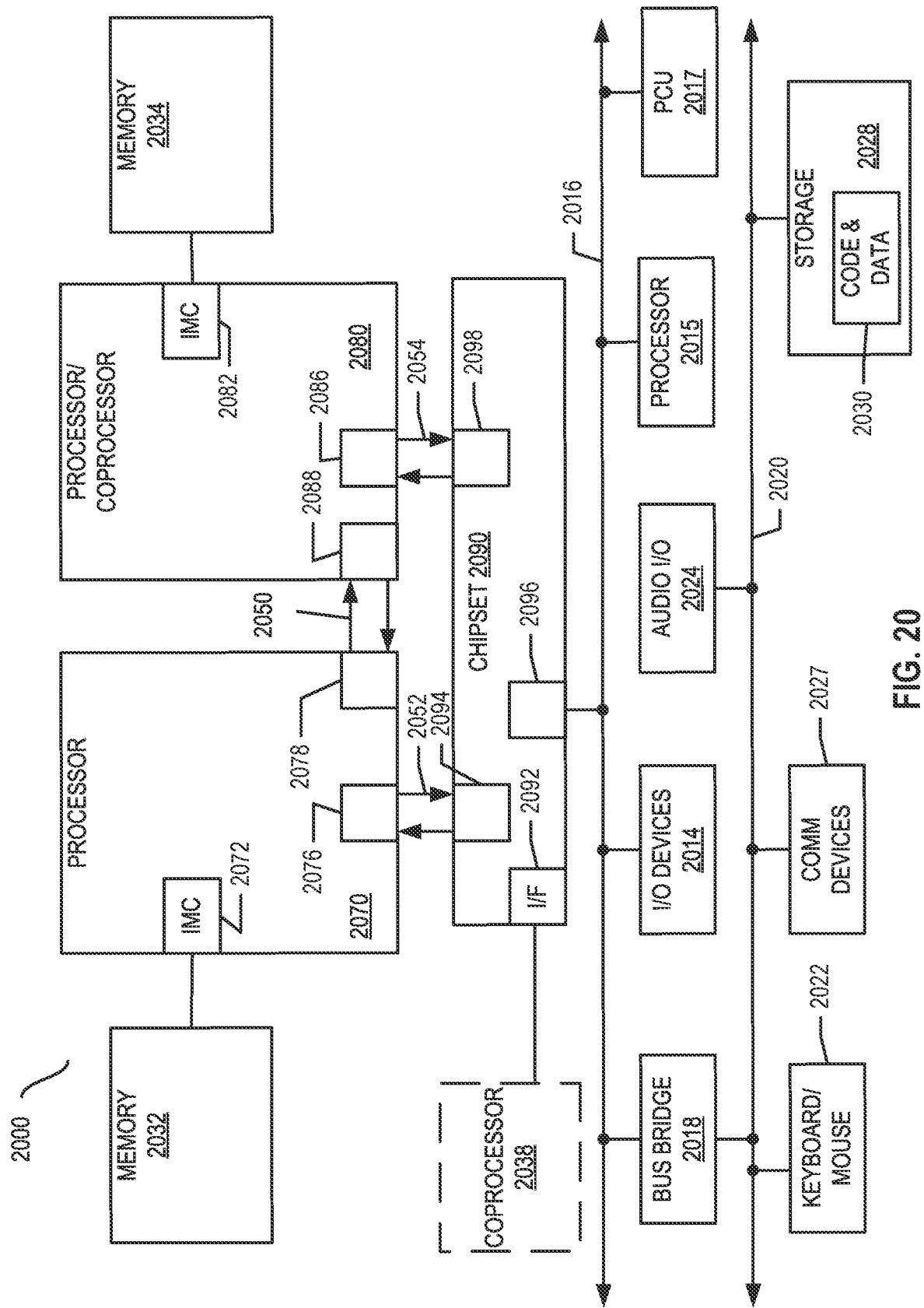
FIG. 20 illustrates an exemplary system.

FIG. 20 illustrates examples of a computing system. Multiprocessor system 2000 is an interfaced system and includes a plurality of processors or cores including a first processor 2070 and a second processor 2080 coupled via an interface 2050 such as a point-to-point interconnect, a fabric, and/or bus. In some examples, the first processor 2070 and the second processor 2080 are homogeneous. In some examples, first processor 2070 and the second processor 2080 are heterogenous. Though the exemplary system 2000 is shown to have two processors, the system may have three or more processors, or may be a single processor system. In some examples, the computing system is a system on a chip.

Processors 2070 and 2080 are shown including integrated memory controller (IMC) circuitry 2072 and 2082, respectively. Processor 2070 also includes as part of its interfaces 2076 and 2078; similarly, second processor 2080 includes interfaces 2086 and 2088. Processors 2070, 2080 may exchange information via the interface 2050 using interface circuits 2078, 2088. IMCs 2072 and 2082 couple the processors 2070, 2080 to respective memories, namely a memory 2032 and a memory 2034, which may be portions of main memory locally attached to the respective processors.

Processors 2070, 2080 may each exchange information with a network interface 2090 via individual interfaces 2052, 2054 using interface circuits 2076, 2094, 2086, 2098. The network interface 2090 may optionally exchange information with a coprocessor 2038 via an interface 2092. In some examples, the coprocessor 2038 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 2070, 2080 or outside of both processors, yet connected with the processors via P-P interconnect, such that either or both processors' local cache information may be stored in the shared cache if a processor is placed into a low power mode.

Network interface 2090 may be coupled to a first interface 2016 via an interface 2096. In some examples, first interface 2016 may be a Peripheral Component Interconnect (PCI) interconnect, or an interconnect such as a PCI Express interconnect or another I/O interconnect. In some examples, one of the interfaces couples to a power control unit (PCU) 2017, which may include circuitry, software, and/or firmware to perform power management operations with regard to the processors 2070, 2080 and/or co-processor 2038. PCU 2017 provides control information to a voltage regulator (not shown) to cause the voltage regulator to generate the appropriate regulated voltage. PCU 2017 also provides control information to control the operating voltage generated. In various examples, PCU 2017 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 2017 is illustrated as being present as logic separate from the processor 2070 and/or processor 2080. In other cases, PCU 2017 may execute on a given one or more of cores (not shown) of processor 2070 or 2080. In some cases, PCU 2017 may be implemented as a microcontroller (dedicated or general-purpose) or other control logic configured to execute its own dedicated power management code, sometimes referred to as P-code. In yet other examples, power management operations to be performed by PCU 2017 may be implemented externally to a processor, such as by way of a separate power management integrated circuit (PMIC) or another component external to the processor. In yet other examples, power management operations to be performed by PCU 2017 may be implemented within BIOS or other system software.

Various I/O devices 2014 may be coupled to first interface 2016, along with a bus bridge 2018 which couples first interface 2016 to a second interface 2020. In some examples, one or more additional processor(s) 2015, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interface 2016. In some examples, second interface 2020 may be a low pin count (LPC) interface. Various devices may be coupled to second interface 2020 including, for example, a keyboard and/or mouse 2022, communication devices 2027 and a storage circuitry 2028. Storage circuitry 2028 may be one or more non-transitory machine-readable storage media as described below, such as a disk drive or other mass storage device which may include instructions/code and data 2030 and may implement the storage 1203 in some examples. Further, an audio I/O 2024 may be coupled to second interface 2020. Note that other architectures than the point-to-point architecture described above are possible. For example, instead of the point-to-point architecture, a system such as multiprocessor system 2000 may implement a multi-drop interface or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 21:
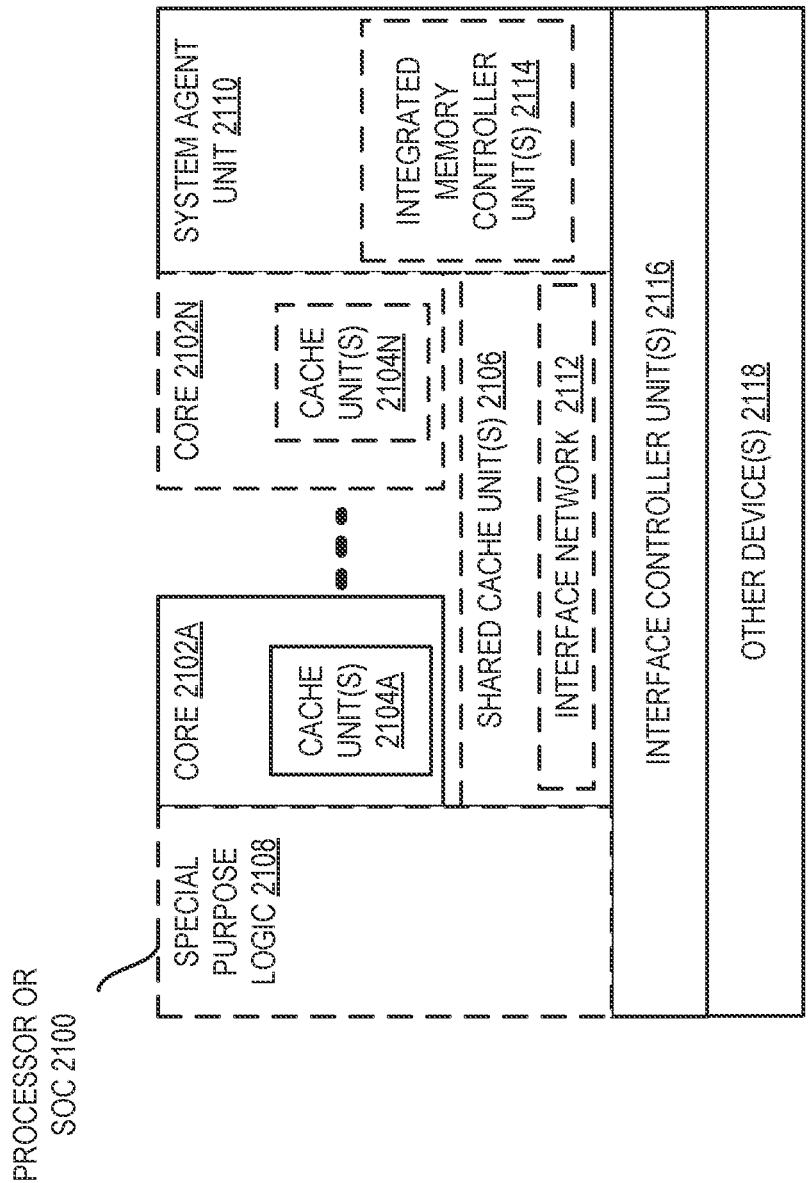
FIG. 21 illustrates a block diagram of an example processor that may have more than one core and an integrated memory controller.

FIG. 21 illustrates a block diagram of examples of a processor 2100 and/or SoC that may have more than one core and an integrated memory controller. The solid lined boxes illustrate a processor 2100 with a single core 2102A, a system agent unit circuitry 2110, a set of one or more interface controller unit(s) circuitry 2116, while the optional addition of the dashed lined boxes illustrates an alternative processor 2100 with multiple cores 2102(A)-(N), a set of one or more integrated memory controller unit(s) circuitry 2114 in the system agent unit circuitry 2110, and special purpose logic 2108, as well as a set of one or more interface controller units circuitry 2116. Note that the processor 2100 may be one of the processors 2070 or 2080, or co-processor 2038 or 2015 of FIG. 20.

Thus, different implementations of the processor 2100 may include: 1) a CPU with the special purpose logic 2108 being integrated graphics and/or scientific (throughput) logic (which may include one or more cores, not shown), and the cores 2102(A)-(N) being one or more general purpose cores (e.g., general purpose in-order cores, general purpose out-of-order cores, or a combination of the two); 2) a coprocessor with the cores 2102(A)-(N) being a large number of special purpose cores intended primarily for graphics and/or scientific (throughput); and 3) a coprocessor with the cores 2102(A)-(N) being a large number of general purpose in-order cores. Thus, the processor 2100 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 2100 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 2104(A)-(N) within the cores 2102(A)-(N), a set of one or more shared cache unit(s) circuitry 2106, and external memory (not shown) coupled to the set of integrated memory controller unit(s) circuitry 2114. The set of one or more shared cache unit(s) circuitry 2106 may include one or more mid-level caches, such as level 2 (L2), level 3 (L3), level 4 (L4), or other levels of cache, such as a last level cache (LLC), and/or combinations thereof. While in some examples an interface network circuitry 2112 (e.g., a ring interconnect) interfaces the special purpose logic 2108 (e.g., integrated graphics logic), the set of shared cache unit(s) circuitry 2106, and the system agent unit circuitry 2110, alternative examples use any number of well-known techniques for interfacing such units. In some examples, coherency is maintained between one or more of the shared cache unit(s) circuitry 2106 and cores 2102(A)-(N). In some examples, controller units circuitry 2116 couple the cores 2102 to one or more other devices 2118 such as one or more I/O devices, storage, one or more communication devices (e.g., wireless networking, wired networking, etc.), etc.

In some examples, one or more of the cores 2102(A)-(N) are capable of multi-threading. The system agent unit circuitry 2110 includes those components coordinating and operating cores 2102(A)-(N). The system agent unit circuitry 2110 may include, for example, power control unit (PCU) circuitry and/or display unit circuitry (not shown). The PCU may be or may include logic and components needed for regulating the power state of the cores 2102(A)-(N) and/or the special purpose logic 2108 (e.g., integrated graphics logic). The display unit circuitry is for driving one or more externally connected displays.

The cores 2102(A)-(N) may be homogenous in terms of instruction set architecture (ISA). Alternatively, the cores 2102(A)-(N) may be heterogeneous in terms of ISA; that is, a subset of the cores 2102(A)-(N) may be capable of executing an ISA, while other cores may be capable of executing only a subset of that ISA or another ISA.

Exemplary Core Architectures-In-Order and Out-of-Order Core Block Diagram.

Figure 22A:
FIG. 22(A) is a block diagram illustrating both an exemplary in-order pipeline and an exemplary register renaming, out-of-order issue/execution pipeline according to examples.
Figure 22B:
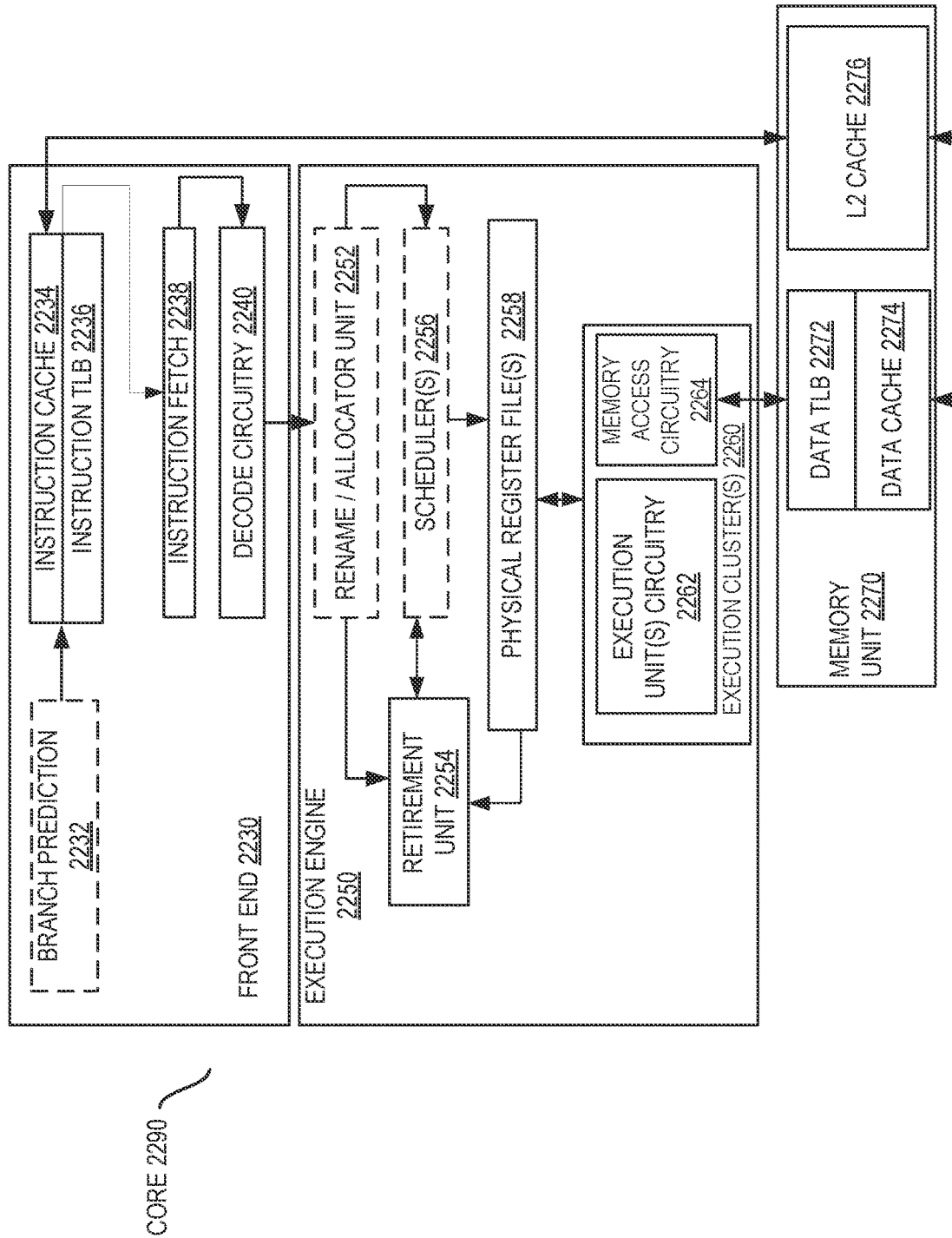
FIG. 22(B) is a block diagram illustrating both an exemplary example of an in-order architecture core and an exemplary register renaming, out-of-order issue/execution architecture core to be included in a processor according to examples.

FIG. 22(A) is a block diagram illustrating both an exemplary in-order pipeline and an exemplary register renaming, out-of-order issue/execution pipeline according to examples. FIG. 22(B) is a block diagram illustrating both an exemplary example of an in-order architecture core and an exemplary register renaming, out-of-order issue/execution architecture core to be included in a processor according to examples. The solid lined boxes in FIGS. 22(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 22(A), a processor pipeline 2200 includes a fetch stage 2202, an optional length decoding stage 2204, a decode stage 2206, an optional allocation (Alloc) stage 2208, an optional renaming stage 2210, a schedule (also known as a dispatch or issue) stage 2212, an optional register read/memory read stage 2214, an execute stage 2216, a write back/memory write stage 2218, an optional exception handling stage 2222, and an optional commit stage 2224. One or more operations can be performed in each of these processor pipeline stages. For example, during the fetch stage 2202, one or more instructions are fetched from instruction memory, and during the decode stage 2206, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 2206 and the register read/memory read stage 2214 may be combined into one pipeline stage. In one example, during the execute stage 2216, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 22(B) may implement the pipeline 2200 as follows: 1) the instruction fetch circuitry 2238 performs the fetch and length decoding stages 2202 and 2204; 2) the decode circuitry 2240 performs the decode stage 2206; 3) the rename/allocator unit circuitry 2252 performs the allocation stage 2208 and renaming stage 2210; 4) the scheduler(s) circuitry 2256 performs the schedule stage 2212; 5) the physical register file(s) circuitry 2258 and the memory unit circuitry 2270 perform the register read/memory read stage 2214; the execution cluster(s) 2260 perform the execute stage 2216; 6) the memory unit circuitry 2270 and the physical register file(s) circuitry 2258 perform the write back/memory write stage 2218; 7) various circuitry may be involved in the exception handling stage 2222; and 8) the retirement unit circuitry 2254 and the physical register file(s) circuitry 2258 perform the commit stage 2224.

FIG. 22(B) shows a processor core 2290 including front-end unit circuitry 2230 coupled to an execution engine unit circuitry 2250, and both are coupled to a memory unit circuitry 2270. The core 2290 may be a reduced instruction set architecture computing (RISC) core, a complex instruction set architecture computing (CISC) core, a very long instruction word (VLIW) core, or a hybrid or alternative core type. As yet another option, the core 2290 may be a special-purpose core, such as, for example, a network or communication core, compression engine, coprocessor core, general purpose computing graphics processing unit (GPGPU) core, graphics core, or the like.

The front end unit circuitry 2230 may include branch prediction circuitry 2232 coupled to an instruction cache circuitry 2234, which is coupled to an instruction translation lookaside buffer (TLB) 2236, which is coupled to instruction fetch circuitry 2238, which is coupled to decode circuitry 2240. In one example, the instruction cache circuitry 2234 is included in the memory unit circuitry 2270 rather than the front-end circuitry 2230. The decode circuitry 2240 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 2240 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 2240 may be implemented using various different mechanisms. Examples of suitable mechanisms include, but are not limited to, look-up tables, hardware implementations, programmable logic arrays (PLAs), microcode read only memories (ROMs), etc. In one example, the core 2290 includes a microcode ROM (not shown) or other medium that stores microcode for certain macroinstructions (e.g., in decode circuitry 2240 or otherwise within the front end circuitry 2230). In one example, the decode circuitry 2240 includes a micro-operation (micro-op) or operation cache (not shown) to hold/cache decoded operations, micro-tags, or micro-operations generated during the decode or other stages of the processor pipeline 2200. The decode circuitry 2240 may be coupled to rename/allocator unit circuitry 2252 in the execution engine circuitry 2250.

The execution engine circuitry 2250 includes the rename/allocator unit circuitry 2252 coupled to a retirement unit circuitry 2254 and a set of one or more scheduler(s) circuitry 2256. The scheduler(s) circuitry 2256 represents any number of different schedulers, including reservations stations, central instruction window, etc. In some examples, the scheduler(s) circuitry 2256 can include arithmetic logic unit (ALU) scheduler/scheduling circuitry, ALU queues, arithmetic generation unit (AGU) scheduler/scheduling circuitry, AGU queues, etc. The scheduler(s) circuitry 2256 is coupled to the physical register file(s) circuitry 2258. Each of the physical register file(s) circuitry 2258 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 2258 includes vector registers unit circuitry, writemask registers unit circuitry, and scalar register unit circuitry. These register units may provide architectural vector registers, vector mask registers, general-purpose registers, etc. The physical register file(s) circuitry 2258 is coupled to the retirement unit circuitry 2254 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 2254 and the physical register file(s) circuitry 2258 are coupled to the execution cluster(s) 2260. The execution cluster(s) 2260 includes a set of one or more execution unit(s) circuitry 2262 and a set of one or more memory access circuitry 2264. The execution unit(s) circuitry 2262 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 2256, physical register file(s) circuitry 2258, and execution cluster(s) 2260 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 2264). It should also be understood that where separate pipelines are used, one or more of these pipelines may be out-of-order issue/execution and the rest in-order.

In some examples, the execution engine unit circuitry 2250 may perform load store unit (LSU) address/data pipelining to an Advanced Microcontroller Bus (AMB) interface (not shown), and address phase and writeback, data phase load, store, and branches.

The set of memory access circuitry 2264 is coupled to the memory unit circuitry 2270, which includes data TLB circuitry 2272 coupled to a data cache circuitry 2274 coupled to a level 2 (L2) cache circuitry 2276. In one exemplary example, the memory access circuitry 2264 may include a load unit circuitry, a store address unit circuit, and a store data unit circuitry, each of which is coupled to the data TLB circuitry 2272 in the memory unit circuitry 2270. The instruction cache circuitry 2234 is further coupled to the level 2 (L2) cache circuitry 2276 in the memory unit circuitry 2270. In one example, the instruction cache 2234 and the data cache 2274 are combined into a single instruction and data cache (not shown) in L2 cache circuitry 2276, a level 3 (L3) cache circuitry (not shown), and/or main memory. The L2 cache circuitry 2276 is coupled to one or more other levels of cache and eventually to a main memory.

The core 2290 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 2290 includes logic to support a packed data instruction set architecture extension (e.g., AVX1, AVX2), thereby allowing the operations used by many multimedia applications to be performed using packed data.

Exemplary Execution Unit(s) Circuitry.

Figure 23:
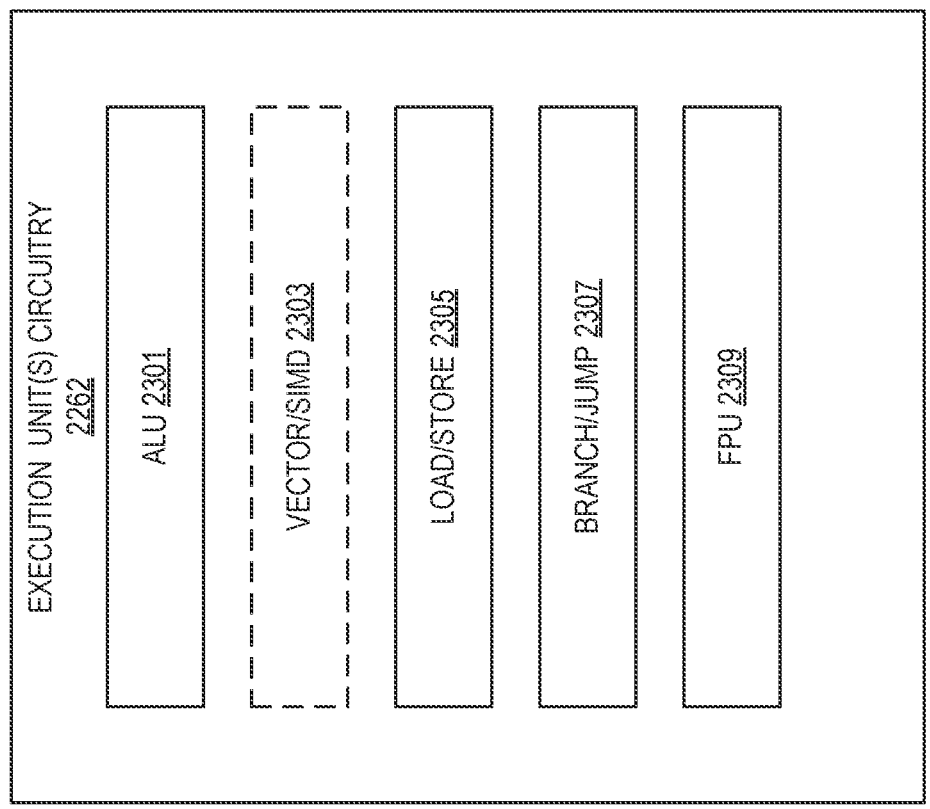
FIG. 23 illustrates examples of execution unit(s) circuitry.

FIG. 23 illustrates examples of execution unit(s) circuitry, such as execution unit(s) circuitry 2262 of FIG. 22(B). As illustrated, execution unit(s) circuitry 2262 may include one or more ALU circuits 2301, optional vector/single instruction multiple data (SIMD) circuits 2303, load/store circuits 2305, branch/jump circuits 2307, and/or Floating-point unit (FPU) circuits 2309. ALU circuits 2301 perform integer arithmetic and/or Boolean operations. Vector/SIMD circuits 2303 perform vector/SIMD operations on packed data (such as SIMD/vector registers). Load/store circuits 2305 execute load and store instructions to load data from memory into registers or store from registers to memory. Load/store circuits 2305 may also generate addresses. Branch/jump circuits 2307 cause a branch or jump to a memory address depending on the instruction. FPU circuits 2309 perform floating-point arithmetic. The width of the execution unit(s) circuitry 2262 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 24:
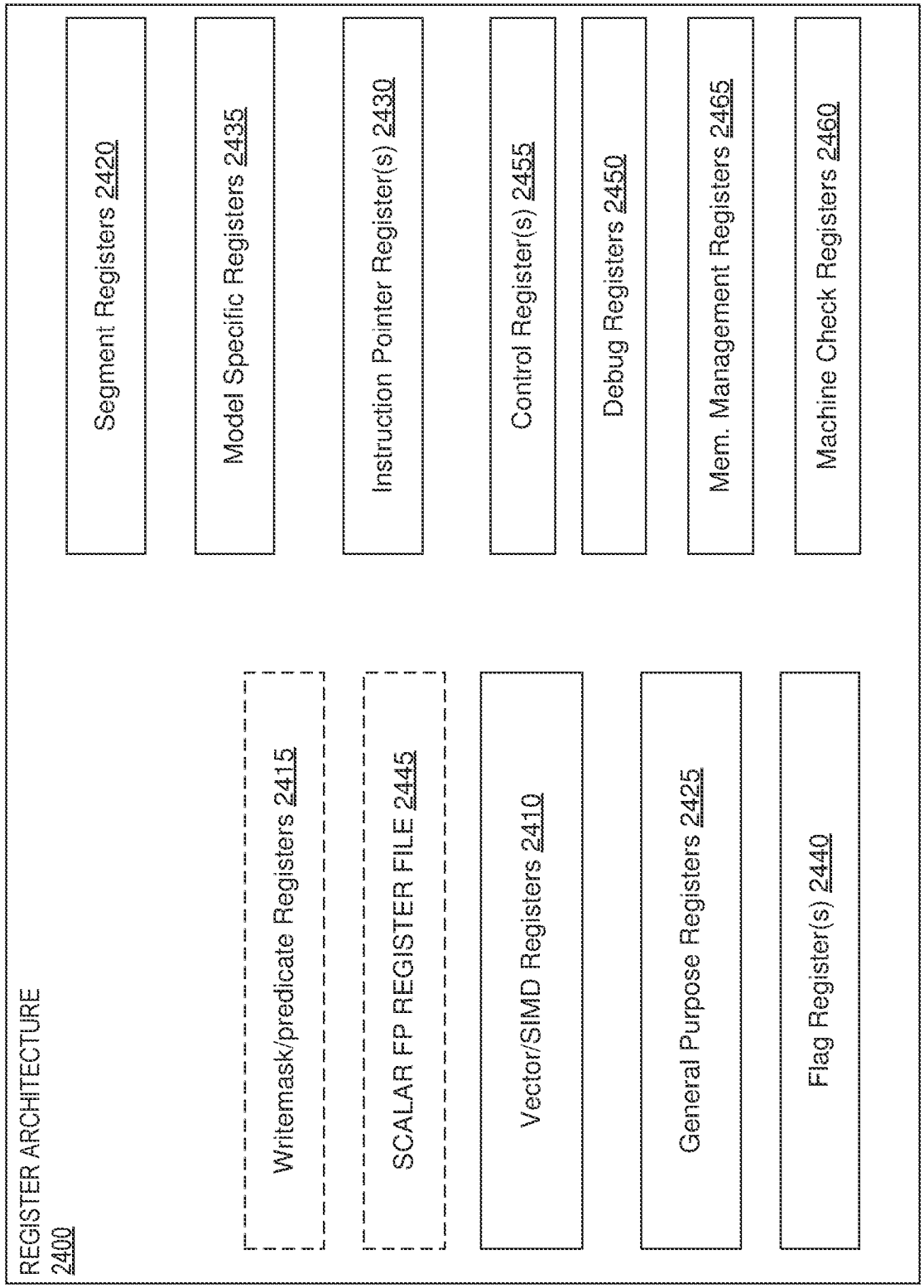
FIG. 24 is a block diagram of a register architecture according to some examples.

FIG. 24 is a block diagram of a register architecture 2400 according to some examples. As illustrated, the register architecture 2400 includes vector/SIMD registers 2410 that vary from 128-bit to 1,024 bits width. In some examples, the vector/SIMD registers 2410 are physically 512-bits and, depending upon the mapping, only some of the lower bits are used. For example, in some examples, the vector/SIMD registers 2410 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 2400 includes writemask/predicate registers 2415. For example, in some examples, there are 8 writemask/predicate registers (sometimes called k0 through k7) that are each 16-bit, 32-bit, 64-bit, or 128-bit in size. Writemask/predicate registers 2415 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 2415 corresponds to a data element position of the destination. In other examples, the writemask/predicate registers 2415 are scalable and consists of a set number of enable bits for a given vector element (e.g., 8 enable bits per 64-bit vector element).

The register architecture 2400 includes a plurality of general-purpose registers 2425. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 2400 includes scalar floating-point (FP) register 2445 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 2440 (e.g., EFLAGS, RFLAGS, etc.) store status and control information for arithmetic, compare, and system operations. For example, the one or more flag registers 2440 may store condition code information such as carry, parity, auxiliary carry, zero, sign, and overflow. In some examples, the one or more flag registers 2440 are called program status and control registers.

Segment registers 2420 contain segment points for use in accessing memory. In some examples, these registers are referenced by the names CS, DS, SS, ES, FS, and GS.

Model specific registers or machine specific registers (MSRs) 2435 control and report on processor performance. Most MSRs 2435 handle system-related functions and are not accessible to an application program. For example, MSRs may provide control for one or more of: performance-monitoring counters, debug extensions, memory type range registers, thermal and power management, instruction-specific support, and/or processor feature/mode support. Machine check registers 2460 consist of control, status, and error reporting MSRs that are used to detect and report on hardware errors. Control register(s) 2455 (e.g., CR0-CR4) determine the operating mode of a processor (e.g., processor 2070, 2080, 2038, 2015, and/or 2100) and the characteristics of a currently executing task. In some examples, MSRs 2435 are a subset of control registers 2455

One or more instruction pointer register(s) 2430 store an instruction pointer value. Debug registers 2450 control and allow for the monitoring of a processor or core's debugging operations.

Memory (mem) management registers 2465 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 2400 may, for example, be used in register file/memory 1208, or physical register file(s) circuitry 2258.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Exemplary Instruction Formats.

Examples of the instruction(s) described herein may be embodied in different formats. Additionally, exemplary systems, architectures, and pipelines are detailed below. Examples of the instruction(s) may be executed on such systems, architectures, and pipelines, but are not limited to those detailed.

FIG. 25 illustrates examples of an instruction format. As illustrated, an instruction may include multiple components including, but not limited to, one or more fields for: one or more prefixes 2501, an opcode 2503, addressing information 2505 (e.g., register identifiers, memory addressing information, etc.), a displacement value 2507, and/or an immediate value 2509. Note that some instructions utilize some or all of the fields of the format whereas others may only use the field for the opcode 2503. In some examples, the order illustrated is the order in which these fields are to be encoded, however, it should be appreciated that in other examples these fields may be encoded in a different order, combined, etc.

The prefix(es) field(s) 2501, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 2503 is used to at least partially define the operation to be performed upon a decoding of the instruction. In some examples, a primary opcode encoded in the opcode field 2503 is one, two, or three bytes in length. In other examples, a primary opcode can be a different length. An additional 3-bit opcode field is sometimes encoded in another field.

Figure 26:
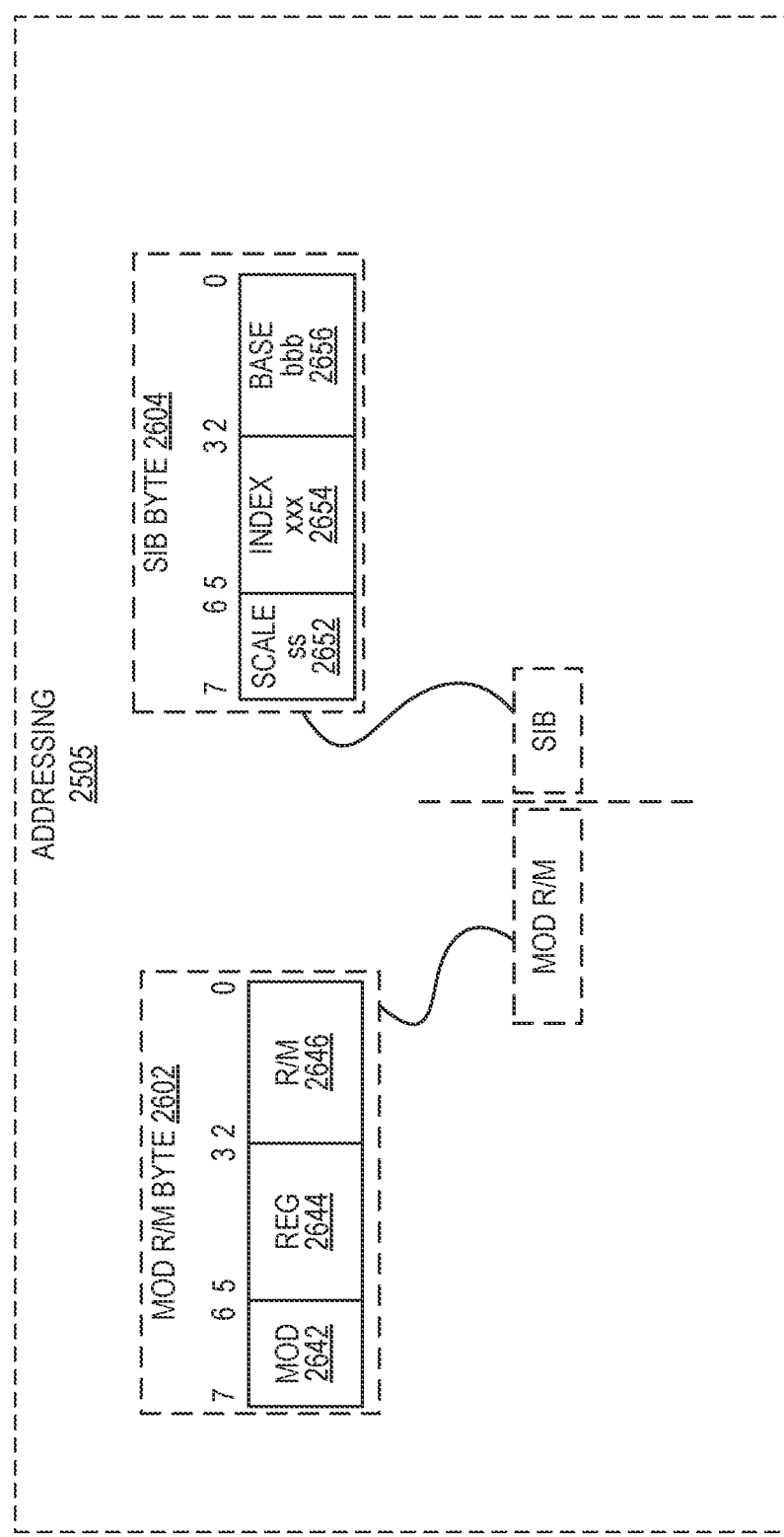
FIG. 26 illustrates examples of an addressing field.

The addressing field 2505 is used to address one or more operands of the instruction, such as a location in memory or one or more registers. FIG. 26 illustrates examples of the addressing field 2505. In this illustration, an optional ModR/M byte 2602 and an optional Scale, Index, Base (SIB) byte 2604 are shown. The ModR/M byte 2602 and the SIB byte 2604 are used to encode up to two operands of an instruction, each of which is a direct register or effective memory address. Note that each of these fields are optional in that not all instructions include one or more of these fields. The MOD R/M byte 2602 includes a MOD field 2642, a register (reg) field 2644, and R/M field 2646.

The content of the MOD field 2642 distinguishes between memory access and non-memory access modes. In some examples, when the MOD field 2642 has a binary value of 11 (11b), a register-direct addressing mode is utilized, and otherwise register-indirect addressing is used.

The register field 2644 may encode either the destination register operand or a source register operand, or may encode an opcode extension and not be used to encode any instruction operand. The content of register index field 2644, directly or through address generation, specifies the locations of a source or destination operand (either in a register or in memory). In some examples, the register field 2644 is supplemented with an additional bit from a prefix (e.g., prefix 2501) to allow for greater addressing.

The R/M field 2646 may be used to encode an instruction operand that references a memory address or may be used to encode either the destination register operand or a source register operand. Note the R/M field 2646 may be combined with the MOD field 2642 to dictate an addressing mode in some examples.

The SIB byte 2604 includes a scale field 2652, an index field 2654, and a base field 2656 to be used in the generation of an address. The scale field 2652 indicates scaling factor. The index field 2654 specifies an index register to use. In some examples, the index field 2654 is supplemented with an additional bit from a prefix (e.g., prefix 2501) to allow for greater addressing. The base field 2656 specifies a base register to use. In some examples, the base field 2656 is supplemented with an additional bit from a prefix (e.g., prefix 2501) to allow for greater addressing. In practice, the content of the scale field 2652 allows for the scaling of the content of the index field 2654 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some examples, a displacement 2507 provides this value. Additionally, in some examples, a displacement factor usage is encoded in the MOD field of the addressing field 2505 that indicates a compressed displacement scheme for which a displacement value is calculated and stored in the displacement field 2507.

In some examples, an immediate field 2509 specifies an immediate value for the instruction. An immediate value may be encoded as a 1-byte value, a 2-byte value, a 4-byte value, etc.

FIG. 27 illustrates examples of a first prefix 2501(A). In some examples, the first prefix 2501(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 2501(A) may specify up to three registers using 3-bit fields depending on the format: 1) using the reg field 2644 and the R/M field 2646 of the Mod R/M byte 2602; 2) using the Mod R/M byte 2602 with the SIB byte 2604 including using the reg field 2644 and the base field 2656 and index field 2654; or 3) using the register field of an opcode.

In the first prefix 2501(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2644 and MOD R/M R/M field 2646 alone can each only address 8 registers.

In the first prefix 2501(A), bit position 2 (R) may be an extension of the MOD R/M reg field 2644 and may be used to modify the ModR/M reg field 2644 when that field encodes a general-purpose register, a 64-bit packed data register (e.g., a SSE register), or a control or debug register. R is ignored when Mod R/M byte 2602 specifies other registers or defines an extended opcode.

Bit position 1 (X) may modify the SIB byte index field 2654.

Bit position 0 (B) may modify the base in the Mod R/M R/M field 2646 or the SIB byte base field 2656; or it may modify the opcode register field used for accessing general purpose registers (e.g., general purpose registers 2425).

FIGS. 28(A)-(D) illustrate examples of how the R, X, and B fields of the first prefix 2501(A) are used. FIG. 28(A) illustrates R and B from the first prefix 2501(A) being used to extend the reg field 2644 and R/M field 2646 of the MOD R/M byte 2602 when the SIB byte 2604 is not used for memory addressing. FIG. 28(B) illustrates R and B from the first prefix 2501(A) being used to extend the reg field 2644 and R/M field 2646 of the MOD R/M byte 2602 when the SIB byte 2604 is not used (register-register addressing). FIG. 28(C) illustrates R, X, and B from the first prefix 2501(A) being used to extend the reg field 2644 of the MOD R/M byte 2602 and the index field 2654 and base field 2656 when the SIB byte 2604 being used for memory addressing. FIG. 28(D) illustrates B from the first prefix 2501(A) being used to extend the reg field 2644 of the MOD R/M byte 2602 when a register is encoded in the opcode 2503.

FIGS. 29(A)-(B) illustrate examples of a second prefix 2501(B). In some examples, the second prefix 2501(B) is an example of a VEX prefix. The second prefix 2501(B) encoding allows instructions to have more than two operands, and allows SIMD vector registers (e.g., vector/SIMD registers 2410) to be longer than 64-bits (e.g., 128-bit and 256-bit). The use of the second prefix 2501(B) provides for three-operand (or more) syntax. For example, previous two-operand instructions performed operations such as A=A+B, which overwrites a source operand. The use of the second prefix 2501(B) enables operands to perform nondestructive operations such as A=B+C.

In some examples, the second prefix 2501(B) comes in two forms—a two-byte form and a three-byte form. The two-byte second prefix 2501(B) is used mainly for 128-bit, scalar, and some 256-bit instructions; while the three-byte second prefix 2501(B) provides a compact replacement of the first prefix 2501(A) and 3-byte opcode instructions.

FIG. 29(A) illustrates examples of a two-byte form of the second prefix 2501(B). In one example, a format field 2901 (byte 0 2903) contains the value C5H. In one example, byte 1 2905 includes a "R" value in bit[7]. This value is the complement of the "R" value of the first prefix 2501(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1 s complement) form and valid for instructions with 2 or more source operands; 2) encode the destination register operand, specified in 1 s complement form for certain vector shifts; or 3) not encode any operand, the field is reserved and should contain a certain value, such as 1111b.

Instructions that use this prefix may use the Mod R/M R/M field 2646 to encode the instruction operand that references a memory address or encode either the destination register operand or a source register operand.

Instructions that use this prefix may use the Mod R/M reg field 2644 to encode either the destination register operand or a source register operand, or to be treated as an opcode extension and not used to encode any instruction operand.

For instruction syntax that support four operands, vvvv, the Mod R/M R/M field 2646 and the Mod R/M reg field 2644 encode three of the four operands. Bits[7:4] of the immediate 2509 are then used to encode the third source register operand.

FIG. 29(B) illustrates examples of a three-byte form of the second prefix 2501(B). In one example, a format field 2911 (byte 0 2913) contains the value C4H. Byte 1 2915 includes in bits[7:5] "R," "X," and "B" which are the complements of the same values of the first prefix 2501(A). Bits[4:0] of byte 1 2915 (shown as mmmmm) include content to encode, as need, one or more implied leading opcode bytes. For example, 00001 implies a 0FH leading opcode, 00010 implies a 0F38H leading opcode, 00011 implies a leading 0F3AH opcode, etc.

Bit[7] of byte 2 2917 is used similar to W of the first prefix 2501(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1 s complement) form and valid for instructions with 2 or more source operands; 2) encode the destination register operand, specified in 1 s complement form for certain vector shifts; or 3) not encode any operand, the field is reserved and should contain a certain value, such as 1111b.

Instructions that use this prefix may use the Mod R/M R/M field 2646 to encode the instruction operand that references a memory address or encode either the destination register operand or a source register operand.

Instructions that use this prefix may use the Mod R/M reg field 2644 to encode either the destination register operand or a source register operand, or to be treated as an opcode extension and not used to encode any instruction operand.

For instruction syntax that support four operands, vvvv, the Mod R/M R/M field 2646, and the Mod R/M reg field 2644 encode three of the four operands. Bits[7:4] of the immediate 2509 are then used to encode the third source register operand.

FIG. 30 illustrates examples of a third prefix 2501(C). In some examples, the third prefix 2501(C) is an example of an EVEX prefix. The third prefix 2501(C) is a four-byte prefix.

The third prefix 2501(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 24) or predication utilize this prefix. Opmask register allow for conditional processing or selection control. Opmask instructions, whose source/destination operands are opmask registers and treat the content of an opmask register as a single value, are encoded using the second prefix 2501(B).

The third prefix 2501(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 2501(C) is a format field 3011 that has a value, in one example, of 62H. Subsequent bytes are referred to as payload bytes 3015-3019 and collectively form a 24-bit value of P[23:0] providing specific capability in the form of one or more fields (detailed herein).

In some examples, P[1:0] of payload byte 3019 are identical to the low two mmmmm bits. P[3:2] are reserved in some examples. Bit P[4] (R') allows access to the high 16 vector register set when combined with P[7] and the ModR/M reg field 2644. P[6] can also provide access to a high 16 vector register when SIB-type addressing is not needed. P[7:5] consist of an R, X, and B which are operand specifier modifier bits for vector register, general purpose register, memory addressing and allow access to the next set of 8 registers beyond the low 8 registers when combined with the ModR/M register field 2644 and ModR/M R/M field 2646. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1 s complement) form and valid for instructions with 2 or more source operands; 2) encode the destination register operand, specified in 1 s complement form for certain vector shifts; or 3) not encode any operand, the field is reserved and should contain a certain value, such as 1111b.

P[15] is similar to W of the first prefix 2501(A) and second prefix 2511(B) and may serve as an opcode extension bit or operand size promotion.

P[18:16] specify the index of a register in the opmask (writemask) registers (e.g., writemask/predicate registers

2415). In one example, the specific value aaa=000 has a special behavior implying no opmask is used for the particular instruction (this may be implemented in a variety of ways including the use of a opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Exemplary examples of encoding of registers in instructions using the third prefix 2501(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | ModR/M reg | GPR, Vector | Destination or Source |
| VVVV | V' | | vvvv | GPR, Vector | 2nd Source or Destination |
| RM | X | B | ModR/M R/M | GPR, Vector | 1st Source or Destination |
| BASE | 0 | B | ModR/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | ModR/M reg | GPR, Vector | Destination or Source |
| VVVV | vvvv | GPR, Vector | $2^{nd}$ Source or Destination |
| RM | ModR/M R/M | GPR, Vector | $1^{st}$ Source or Destination |

TABLE 2-continued

Encoding Register Specifiers in 32-bit Mode

| | [2:0] | REG. TYPE | COMMON USAGES |
|---|---|---|---|
| BASE | ModR/M R/M | GPR | Memory addressing |
| INDEX | SIB.index | GPR | Memory addressing |
| VIDX | SIB.index | Vector | VSIB memory addressing |

TABLE 3

Opmask Register Specifier Encoding

| | [2:0] | REG. TYPE | COMMON USAGES |
|---|---|---|---|
| REG | ModR/M Reg | k0-k7 | Source |
| VVVV | vvvv | k0-k7 | $2^{nd}$ Source |
| RM | ModR/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 31 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 31 shows a program in a high-level language 3102 may be compiled using a first ISA compiler 3104 to generate first ISA binary code 3106 that may be natively executed by a processor with at least one first instruction set architecture core 3116. The processor with at least one first ISA instruction set architecture core 3116 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 3104 represents a compiler that is operable to generate first ISA binary code 3106 (e.g., object code) that can, with or without additional linkage processing, be executed on the processor with at least one first ISA instruction set architecture core 3116. Similarly, FIG. 31 shows the program in the high-level language 3102 may be compiled using an alternative instruction set architecture compiler 3108 to generate alternative instruction set architecture binary code 3110 that may be natively executed by a processor without a first ISA instruction set architecture core 3114. The instruction converter 3112 is used to convert the first ISA binary code 3106 into code that may be natively executed by the processor without a first ISA instruction set architecture core 3114. This converted code is not necessarily to be the same as the alternative instruction set architecture binary code 3110; however, the converted code will accomplish the general operation and be made up of instructions from the alternative instruction set architecture. Thus, the instruction converter 3112 represents software, firmware, hardware, or a combination thereof that, through emulation, simulation or any other process, allows a processor or other electronic device that does not have a first ISA instruction set architecture processor or core to execute the first ISA binary code 3106.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Examples include, but are not limited to:

1. An apparatus comprising:
    decoder circuitry to decode an instance of a single instruction, the single instruction to include fields for an opcode, one or fields to reference a first source operand, one or fields to reference a second source operand, one or fields to reference a destination operand, wherein the opcode is to indicate that execution circuitry is, in response to a decoded instance of the single instruction, to at least:
        perform a prefix sum by for each non-masked data element position of the second source operand adding a data element of that data element position to each data element of preceding data element positions and adding at least one data element of a defined data element position of the first source operand, and
        store each prefix sum for each data element position of the second source operand into a corresponding data element position of the destination operand; and
    execution circuitry configured to execute the decoded instruction according to the opcode.
2. The apparatus of example 1, wherein the one or more fields to reference the first source operand identify a vector register.
3. The apparatus of example 1, wherein the one or more fields to reference the first source operand identify a vector register identify a memory location.
4. The apparatus of any of examples 1-3, wherein packed data elements of the first and second sources are of a datatype unsigned integer, signed integer, and floating point.
5. The apparatus of example 5, wherein packed data elements of the first and second sources are 8-bit, 16-bit, 32-bit, or 64-bit in size.
6. The apparatus of any of examples 1-5, wherein the instance of the single instruction further comprises a field for a prefix, wherein the prefix provides one or more fields to reference a mask operand and one or more bits to be used to reference the at least one of the sources.
7. The apparatus of example 6, wherein the execution circuitry is to use the mask operand to determine which data element positions of the destination operand to write.
8. The apparatus of example 6, the execution circuitry is to use the mask operand to determine which data element positions of the second source to unmask.
9. A method comprising:
    decoding an instance of a single instruction, the single instruction including fields for an opcode, one or fields to reference a first source operand, one or fields to reference a second source operand, one or fields to reference a destination operand, wherein the opcode is to indicate that execution circuitry is, in response to a decoded instance of the single instruction, to at least:
        perform a prefix sum by for each non-masked data element position of the second source operand adding a data element of that data element position to each data element of preceding data element positions and adding at least one data element of a defined data element position of the first source operand, and
        store each prefix sum for each data element position of the second source operand into a corresponding data element position of the destination operand; and
    executing the decoded instruction according to the opcode.
10. The method of example 9, wherein the one or more fields to reference the first source operand identify a vector register.
11. The method of example 9, wherein the one or more fields to reference the first source operand identify a vector register identify a memory location.
12. The method of any of examples 9-11, wherein packed data elements of the first and second sources are of a datatype unsigned integer, signed integer, and floating point.
13. The method of example 12, wherein packed data elements of the first and second sources are 8-bit, 16-bit, 32-bit, or 64-bit in size.
14. The method of any of examples 9-13, wherein the instance of the single instruction further comprises a field for a prefix, wherein the prefix provides one or more fields to reference a mask operand and one or more bits to be used to reference the at least one of the sources.
15. The method of example 14, wherein the executing is to use the mask operand to determine which data element positions of the destination operand to write.
16. The method of example 14, the executing is to use the mask operand to determine which data element positions of the second source to unmask.
17. A method comprising:
    translating an instance of a single instruction of a first instruction set architecture to one or more instructions of a second instruction set architecture, the single instruction including fields for an opcode, one or fields to reference a first source operand, one or fields to reference a second source operand, one or fields to reference a destination operand, wherein the opcode is to indicate that execution circuitry is, in response to a decoded instance of the single instruction, to at least:
        perform a prefix sum by for each non-masked data element position of the second source operand adding a data element of that data element position to each data element of preceding data element positions and adding at least one data element of a defined data element position of the first source operand, and store each prefix sum for each data element position of the second source operand into a corresponding data element position of the destination operand; and decoding the one or more instructions of the second instruction set architecture;

executing the decoded one or more instructions of the second instruction set architecture instruction according to the opcode of the single instruction of the first instruction set architecture.

18. The method of example 17, wherein the one or more fields to reference the first source operand identify a vector register.

19. The method of example 17, wherein the one or more fields to reference the first source operand identify a vector register identify a memory location.

20. The method of any of examples 17-19, wherein packed data elements of the first and second sources are of a datatype unsigned integer, signed integer, and floating point.

21. The method of example 20, wherein packed data elements of the first and second sources are 8-bit, 16-bit, 32-bit, or 64-bit in size.

22. The method of any of examples 17-21, wherein the instance of the single instruction further comprises a field for a prefix, wherein the prefix provides one or more fields to reference a mask operand and one or more bits to be used to reference the at least one of the sources.

23. The method of example 22, wherein the executing is to use the mask operand to determine which data element positions of the destination operand to write.

24. The method of example 22, the executing is to use the mask operand to determine which data element positions of the second source to unmask.

25. A system comprising:
memory to store an instance of a single instruction; and
a processor core comprising:
decoder circuitry to decode an instance of the single instruction, the single instruction to include fields for an opcode, one or fields to reference a first source operand, one or fields to reference a second source operand, one or fields to reference a destination operand, wherein the opcode is to indicate that execution circuitry is, in response to a decoded instance of the single instruction, to at least:
perform a prefix sum by for each non-masked data element position of the second source operand adding a data element of that data element position to each data element of preceding data element positions and adding at least one data element of a defined data element position of the first source operand, and
store each prefix sum for each data element position of the second source operand into a corresponding data element position of the destination operand; and
execution circuitry configured to execute the decoded instruction according to the opcode.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
decoder circuitry to decode an instance of a single instruction, the single instruction to include fields for an opcode, one or fields to reference a first source operand, one or fields to reference a second source operand, one or fields to reference a destination operand, wherein the opcode is to indicate that execution circuitry is, in response to a decoded instance of the single instruction, to at least:
perform a prefix sum by for each non-masked data element position of the second source operand adding a data element of that data element position to each data element of preceding data element positions and adding at least one data element of a defined data element position of the first source operand, and
store each prefix sum for each data element position of the second source operand into a corresponding data element position of the destination operand; and
execution circuitry configured to execute the decoded instruction according to the opcode.

2. The apparatus of claim 1, wherein the one or more fields to reference the first source operand identify a vector register.

3. The apparatus of claim 1, wherein the one or more fields to reference the first source operand identify a vector register identify a memory location.

4. The apparatus of claim 1, wherein packed data elements of the first and second sources are of a datatype unsigned integer, signed integer, and floating point.

5. The apparatus of claim 4, wherein packed data elements of the first and second sources are 8-bit, 16-bit, 32-bit, or 64-bit in size.

6. The apparatus of claim 1, wherein the instance of the single instruction further comprises a field for a prefix, wherein the prefix provides one or more fields to reference a mask operand and one or more bits to be used to reference the at least one of the sources.

7. The apparatus of claim 6, wherein the execution circuitry is to use the mask operand to determine which data element positions of the destination operand to write.

8. The apparatus of claim 6, the execution circuitry is to use the mask operand to determine which data element positions of the second source to unmask.

9. A method comprising:
decoding an instance of a single instruction, the single instruction including fields for an opcode, one or more fields to reference a first source operand, one or more fields to reference a second source operand, one or more fields to reference a destination operand, wherein the opcode is to indicate that execution circuitry is, in response to a decoded instance of the single instruction, to at least:
perform a prefix sum by for each non-masked data element position of the second source operand adding a data element of that data element position to each data element of preceding data element positions and adding at least one data element of a defined data element position of the first source operand, and
store each prefix sum for each data element position of the second source operand into a corresponding data element position of the destination operand; and executing the decoded instruction according to the opcode.

10. The method of claim 9, wherein the one or more fields to reference the first source operand identify a vector register.

11. The method of claim 9, wherein the one or more fields to reference the first source operand identify a vector register identify a memory location.

12. The method of claim 9, wherein packed data elements of the first and second sources are of a datatype unsigned integer, signed integer, and floating point.

13. The method of claim 12, wherein packed data elements of the first and second sources are 8-bit, 16-bit, 32-bit, or 64-bit in size.

14. The method of claim 9, wherein the instance of the single instruction further comprises a field for a prefix, wherein the prefix provides one or more fields to reference a mask operand and one or more bits to be used to reference the at least one of the sources.

15. The method of claim 14, wherein the executing is to use the mask operand to determine which data element positions of the destination operand to write.

16. The method of claim 14, the executing is to use the mask operand to determine which data element positions of the second source to unmask.

17. A method comprising:
  translating an instance of a single instruction of a first instruction set architecture to one or more instructions of a second instruction set architecture, the single instruction including fields for an opcode, one or more fields to reference a first source operand, one or more fields to reference a second source operand, one or more fields to reference a destination operand, wherein the opcode is to indicate that execution circuitry is, in response to a decoded instance of the single instruction, to at least:
    perform a prefix sum by for each non-masked data element position of the second source operand adding a data element of that data element position to each data element of preceding data element positions and adding at least one data element of a defined data element position of the first source operand, and
    store each prefix sum for each data element position of the second source operand into a corresponding data element position of the destination operand; and
  decoding the one or more instructions of the second instruction set architecture;
  executing the decoded one or more instructions of the second instruction set architecture instruction according to the opcode of the single instruction of the first instruction set architecture.

18. The method of claim 17, wherein the one or more fields to reference the first source operand identify a vector register.

19. The method of claim 17, wherein the one or more fields to reference the first source operand identify a vector register identify a memory location.

20. The method of claim 17, wherein packed data elements of the first and second sources are of a datatype unsigned integer, signed integer, and floating point.

21. The method of claim 20, wherein packed data elements of the first and second sources are 8-bit, 16-bit, 32-bit, or 64-bit in size.

22. The method of claim 21, wherein the instance of the single instruction further comprises a field for a prefix, wherein the prefix provides one or more fields to reference a mask operand and one or more bits to be used to reference the at least one of the sources.

23. The method of claim 22, wherein the executing is to use the mask operand to determine which data element positions of the destination operand to write.

24. The method of claim 22, the executing is to use the mask operand to determine which data element positions of the second source to unmask.

25. A system comprising:
  memory to store an instance of a single instruction; and
  a processor core comprising:
    decoder circuitry to decode an instance of the single instruction, the single instruction to include fields for an opcode, one or more fields to reference a first source operand, one or more fields to reference a second source operand, one or more fields to reference a destination operand, wherein the opcode is to indicate that execution circuitry is, in response to a decoded instance of the single instruction, to at least:
      perform a prefix sum by for each non-masked data element position of the second source operand adding a data element of that data element position to each data element of preceding data element positions and adding at least one data element of a defined data element position of the first source operand, and
      store each prefix sum for each data element position of the second source operand into a corresponding data element position of the destination operand; and
    execution circuitry configured to execute the decoded instruction according to the opcode.

* * * * *